United States Patent
Kernen et al.

(10) Patent No.: US 12,448,026 B1
(45) Date of Patent: Oct. 21, 2025

(54) STEERING RACK BRACE

(71) Applicant: Super ATV, LLC, Madison, IN (US)

(72) Inventors: Clint Kernen, Madison, IN (US);
Jason T. Stewart, Harvest, AL (US)

(73) Assignee: Super ATV, LLC, Madison, IN (US)

( * ) Notice: Subject to any disclaimer, the term of this patent is extended or adjusted under 35 U.S.C. 154(b) by 0 days.

(21) Appl. No.: 19/059,369

(22) Filed: Feb. 21, 2025

(51) Int. Cl.
*B62D 3/12* (2006.01)
*B62D 7/20* (2006.01)

(52) U.S. Cl.
CPC ............... *B62D 3/126* (2013.01); *B62D 7/20* (2013.01)

(58) Field of Classification Search
CPC ............ B62D 3/12; B62D 3/126; B62D 7/20
USPC ........................................ 280/93.514, 93.515
See application file for complete search history.

(56) References Cited

U.S. PATENT DOCUMENTS

| | | | |
|---|---|---|---|
| 3,958,462 | A | 5/1976 | Matschinsky |
| 5,597,049 | A | 1/1997 | Bruehl |
| 6,547,266 | B2 | 4/2003 | Lee |
| 8,454,039 | B2 | 6/2013 | Murakami |
| 9,016,424 | B2 | 4/2015 | Awano |
| 9,783,224 | B1 | 10/2017 | Roberts |
| 11,891,123 | B2 | 2/2024 | Reynolds |
| 2022/0119032 | A1* | 4/2022 | Reynolds ................. B62D 3/12 |
| 2023/0081629 | A1 | 3/2023 | Heon |
| 2024/0246600 | A1 | 7/2024 | Hayashi |

FOREIGN PATENT DOCUMENTS

GB 1239770 7/1971

OTHER PUBLICATIONS

Badd Ass Unlimited, Can Am X3 Steering Rack Brace—Support, Sep. 27, 2024 (pp. 3) https://urldefense.proofpoint.com/v2/url?u=https-3A_www.badassunlimited.com.
Black Ops Machine, X3 Rack Support, Sep. 27, 2024 (pp. 3) https://urldefense.proofpoint.com/v2/url?u-https-3A_blackopsmachine.com.
Hess Motorsports, Can-Am X3 Rack Support V2, Sep. 27, 2024 (pp. 2, https://urldefense.proofpoint.com/v2/url?u=https-3A_www.hess-2Dmotorsports.com_products.
https://www.youtube.com/watch?v=Ci2bXztfeXs dated Feb. 12, 2025 (pp. 3).
Sandcraft, Steering Support Assembly-2018-2024 Can Am, Sep. 27, 2024 (pp. 2), https://sandcraftmotorsports.com/product/steering-support-assembly.

* cited by examiner

*Primary Examiner* — Jason D Shanske
*Assistant Examiner* — Daniel M. Keck
(74) *Attorney, Agent, or Firm* — Woodard, Emhardt, Henry, Reeves & Wagner, LLP

(57) ABSTRACT

A steering rack brace assembly that includes a brace rigidly coupled relative to the steering rack so that the brace extends along the longitudinal direction near the rack, a follower assembly coupled to the steering rack assembly so that it traverses in unison with the steering arm, wherein one of the brace assembly or the follower assembly defines a linear track that extends in the longitudinal direction, and where the other of the brace or the follower assembly includes a first roller bearing that traverses the linear track to resist rotational forces applied to the steering rack about the longitudinal centerline.

20 Claims, 20 Drawing Sheets

STEERING RACK BRACE

BACKGROUND

The present disclosure relates to an external support brace for a steering rack.

There are situations where originally supplied steering racks are insufficient for extreme use. For example, recreational off-road vehicles such as UTVs and ATVs are operated over rough terrain such as irregular roads, steep inclines and declines. Operation over rough terrain, particularly at speed, can place high loads on suspension components including steering racks. Furthermore, off-road vehicles can be modified for increased ground clearance by adding portal boxes and using larger diameter wheels. Larger diameter wheels increase the moment arm that various forces act through, including loads applied to steering racks. Some stock steering racks may be subject to premature wear or failure due to extreme driving, with or without larger wheels.

For example, the CAN-AM X3 stock steering rack uses a round rack gear that has been shown to have an inherent problem that can lead to premature wear and reduced steering performance. Known issues include excessive steering feedback, loose handling, inconsistent steering, binding, excessive wear and steering wheel kickback.

Specifically, the center link, which is coupled by tie rods to the wheels being steered, is laterally offset from the round rack gear. The tie rods translate forces from the wheels to the center link. Because the center link is laterally offset from the round rack gear, forces from the wheels can be oriented such that they generate a rotation force on the center link relative to the round rack gear. Such rotational forces can cause the round rack gear to bind with pinion teeth, can cause deflection and/or rotation of the round rack gear and can cause binding between the round rack gear and bushings on the side of the round rack gear.

Binding between the round rack gear and the pinion and/or bushings can overload the power steering system of the vehicle, which is computer controlled. When the controller detects an over-amperage of the power steering system due to binding, it can reset the power steering system to protect the power steering system. Such resets can generate a short period where the power steering is unresponsive, which can impact the feel and responsiveness of the steering system. Even without a reset, such binding can also cause reduced steering performance including excessive steering feedback, inconsistent steering, binding, excessive wear and steering wheel kickback.

In addition to the stock CAN-AM X3 steering rack, there are also other steering racks on the market that may be inadequate when portal hubs and larger wheels are added to a vehicle that could benefit from a steering rack brace.

Known solutions to this issue include replacement steering racks that are better able to handle the forces from the tie rods and steering rack braces that use plain bearings to counteract the rotational force from the center link. However, replacing the original steering rack is expensive and plain bearings have their own wear issues. There is a need for an improved steering rack brace. This can be accomplished through a combination of several design features described below.

DESCRIPTION OF THE SELECTED EMBODIMENTS

Figure 1:
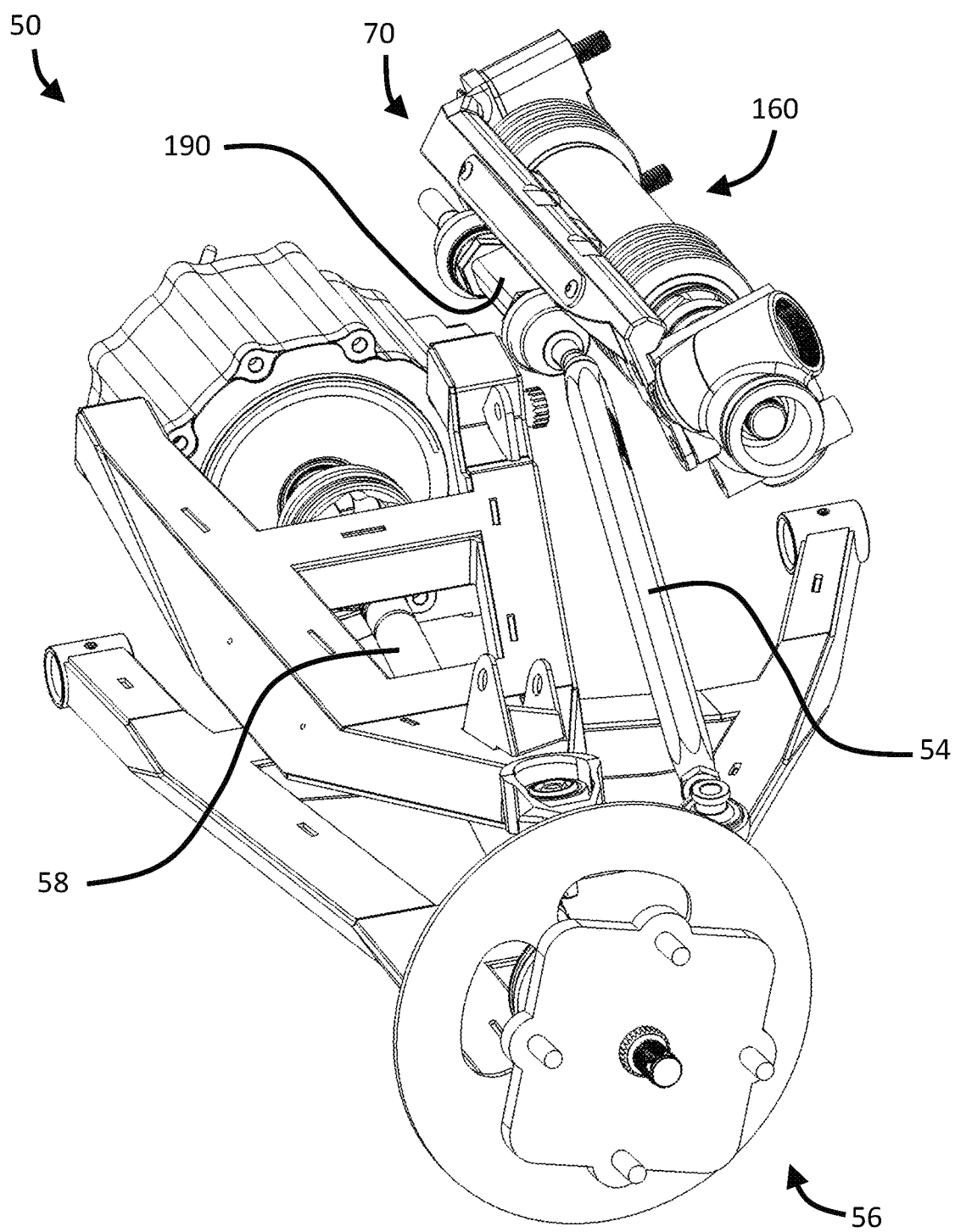
FIG. 1 is a perspective view of a portion of a vehicle suspension.

For the purpose of promoting an understanding of the principles of the claimed invention, reference will now be made to the embodiments illustrated in the drawings and specific language will be used to describe the same. It will nevertheless be understood that no limitation of the scope of the claimed invention is thereby intended. Any alterations and further modifications in the described embodiments, and any further applications of the principles of the claimed invention as described herein are contemplated as would normally occur to one skilled in the art to which the claimed invention relates. One embodiment of the claimed invention is shown in great detail, although it will be apparent to those skilled in the relevant art that some features that are not relevant to the present claimed invention may not be shown for the sake of clarity.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "left", "right", "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

Figure 2:
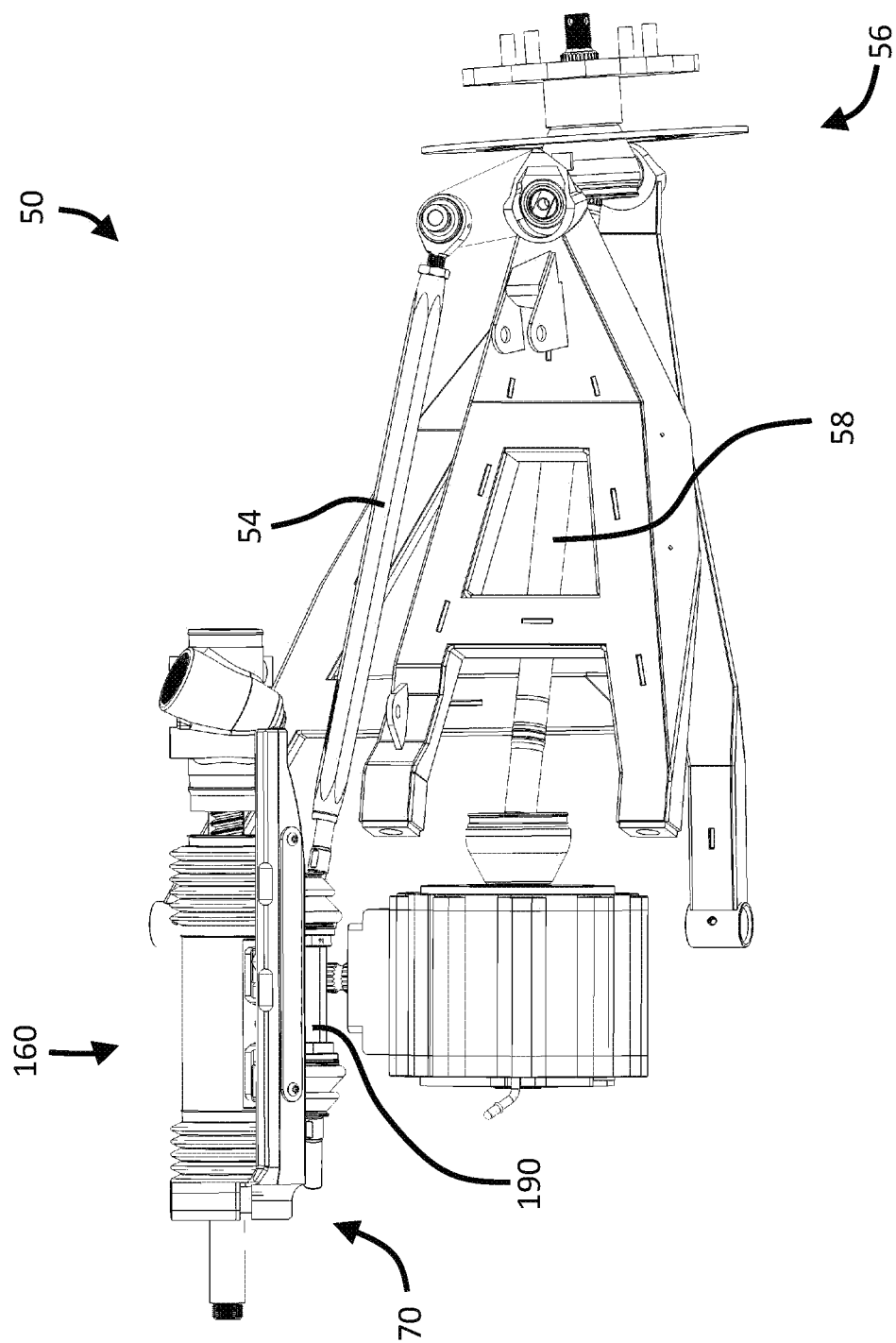
FIG. 2 is a top plan view of the FIG. 1 vehicle suspension.

Referring to FIGS. 1 and 2, a portion of a suspension of a vehicle 50 is illustrated. Vehicle 50 can be used for driving on rough terrain, such as for off-road driving. For example, vehicle 50 can be an all-terrain vehicle (ATV), utility task vehicle (UTV), and/or another type of vehicle. As shown, vehicle 50 typically includes a knuckle 56, an axel 58, a tie rod 54, and a steering rack assembly 160. Knuckle 56 is configured to attach to a wheel and to transfer rotational power to the wheel. Vehicle 50 is configured to transmit rotational power to knuckle 56 through axel 58. Steering rack assembly 160 is configured to pivot knuckle 56 and the wheel so as to steer vehicle 50. Steering rack assembly 160 is connected to knuckle 56 through tie rod 54. Tie rod 54 is configured to transfer linear force from steering rack assembly 160 to knuckle 56 to cause knuckle 56 to pivot. Steering rack assembly 160 includes a steering arm 190 that extends from steering rack assembly 160 and couples to tie rod 54. Note, the suspension components illustrated in FIGS. 1 and 2 are mirrored on the opposite side of vehicle 50, with steering arm 190 coupled to another tie rod 54 on the opposite side (not illustrated).

As illustrated, vehicle 50 further includes a brace assembly 70. Brace assembly 70 is configured to stabilize steering rack assembly 160. Particularly, brace assembly 70 is configured to limit or prevent rotation of steering rack assembly 160 relative to vehicle 50. Because steering arm 190 extends laterally from steering rack assembly 160, forces on tie rod 54 can cause steering rack assembly 160 to rotate. In other words, steering arm 190 can act as a lever that rotates steering rack assembly 160 in response to forces from tie rod 54. For example, if vehicle 50 drives over particularly rough terrain, such as a large bump and/or a steep incline or decline, the wheel and knuckle 56 can experience a rotational moment. Knuckle 56 can push tie rod 54 upward or downward. This can cause gears in steering rack assembly 160 to bind, cause excessive wear, and/or interfere with steering in other ways. Brace assembly 70 attaches to steering rack assembly 160 to limit or prevent such rotation. In this way, brace assembly 70 ensures that steering rack 172 can operate properly and without experiencing excessive wear and/or other issues.

Figure 3:
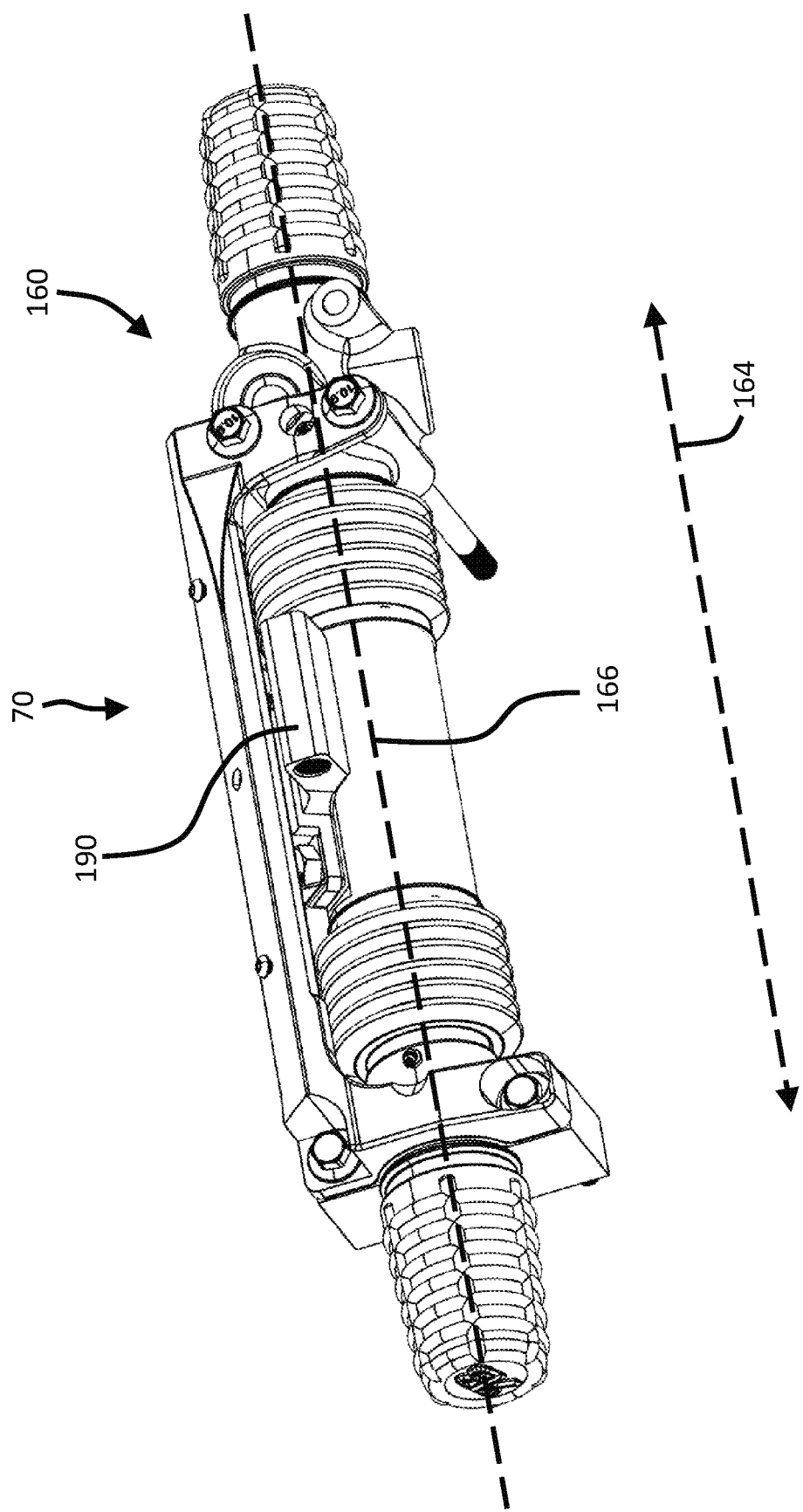
FIG. 3 is a front perspective view of a steering rack assembly and a brace assembly, components of the FIG. 1 vehicle.
Figure 4:
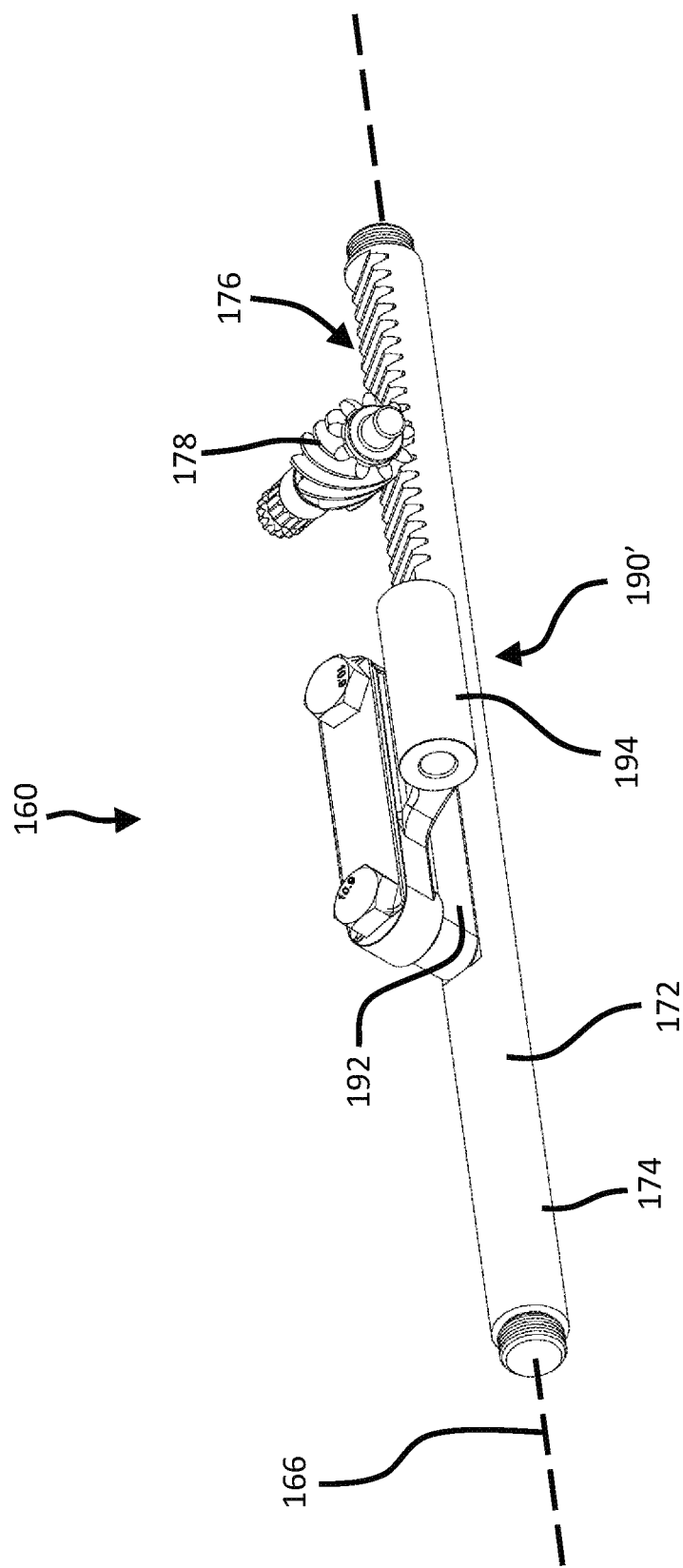
FIG. 4 is a perspective view of a steering arm, a component of the FIG. 3 steering rack assembly.
Figure 5:
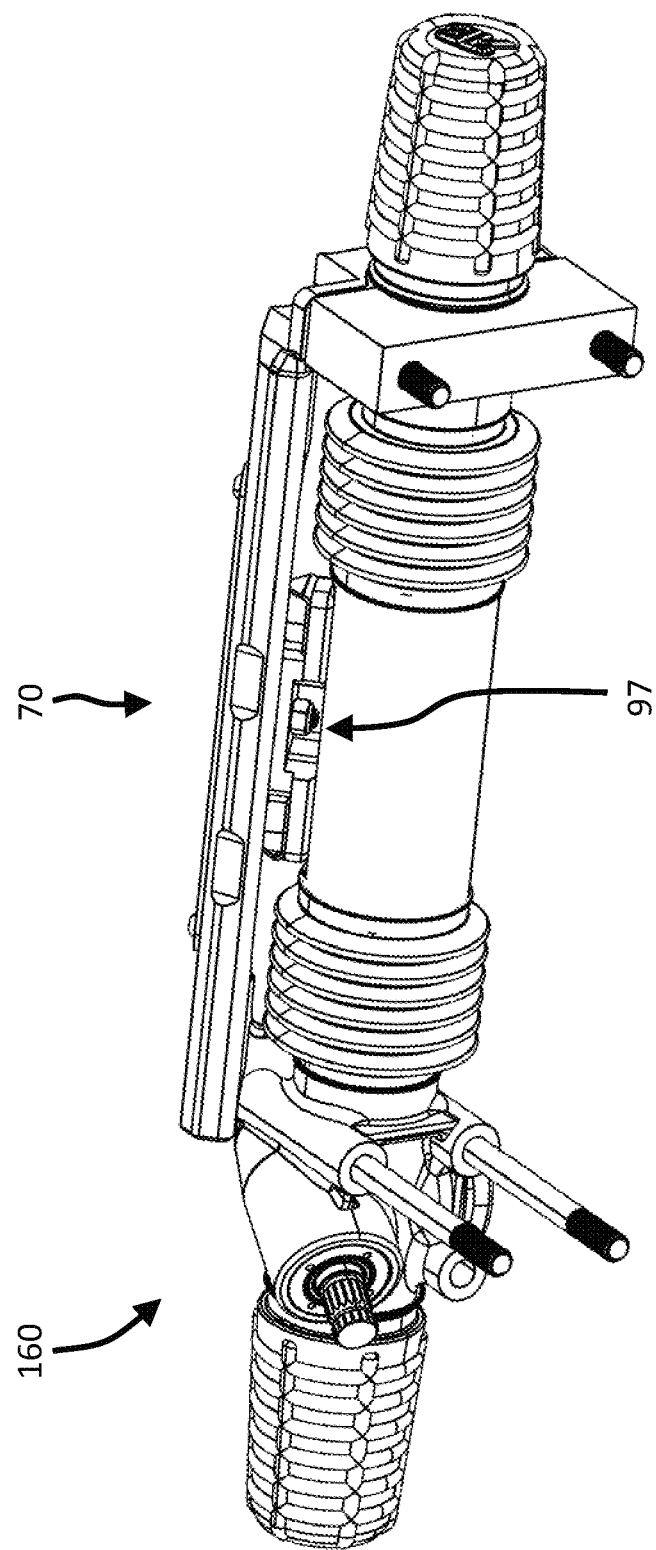
FIG. 5 is a rear perspective view of the FIG. 3 steering rack assembly and brace assembly.

Referring to FIGS. 3, 4, and 5, steering rack assembly 160 extends lengthwise in a longitudinal direction 164. Steering rack assembly 160 further defines a longitudinal centerline 166. Longitudinal centerline 166 generally extends through the center of steering rack assembly 160 and along longitudinal direction 164. Brace assembly 70 is configured to retrofit onto steering rack assembly 160. Brace assembly 70 similarly extends along longitudinal direction 164. Brace assembly 70 is configured to attach to steering rack assembly 160 at multiple points going along longitudinal direction 164. Brace assembly 70 is generally configured to limit or prevent rotation of steering rack assembly 160 about longitudinal centerline 172.

As illustrated, steering rack assembly 160 includes a steering rack 172 and steering arm 190. Steering arm 190 is rigidly coupled to steering rack 172. Steering rack 172 and steering arm 190 are configured to move along longitudinal direction 164 together within steering rack assembly 160. Steering arm 190 connects steering rack 172 to the wheels of vehicle 50 through tie rods 54.

Steering arm 190 generally includes a first portion 192 and a second portion 194. First portion 192 is configured to attach to steering rack 172. First portion 192 is generally aligned with steering rack 172 and extends from steering rack 172 along a radial direction relative to longitudinal axis 166. Second portion 194 is configured to receive and couple to tie rod 54. Second portion 194 extends laterally away from first portion 192 at an obtuse angle. Second portion 194 is laterally offset from steering rack 172. The position of second portion 194 relative to steering rack 172 allows tie rod 54 to induce twisting forces to steering arm 190 that could result in rotation of steering rack 172 about longitudinal axis 166. In the FIG. 4 example, steering arm 190 is in the form of an original equipment steering arm 190'. In the FIGS. 3 and 5 example, steering arm 190 can be incorporated into brace assembly 70. For example, a user can remove original equipment steering arm 190' from steering rack assembly 160 when installing brace assembly 70. In that example, brace assembly 70 includes a replacement steering arm 190.

Steering rack 172 is configured to move along longitudinal direction 164 within steering rack assembly 160. Steering rack 172 defines longitudinal centerline 166 through the center of steering rack 172. In the illustrated example, steering rack 172 is in the form of a cylindrical rack 174. As shown, cylindrical rack 174 generally has a uniform, round cross-sectional shape. The uniform, round shape of cylindrical rack 174 does not provide any resistance to rotation about longitudinal centerline 166 within steering rack assembly 160. When steering arm 190 experiences force from tie rod 54, steering arm 190 can cause steering rack 172 to rotate about longitudinal centerline 166.

Steering rack assembly 160 further includes a pinion 178. Steering rack 172 includes teeth 176 that are configured to interact with pinion 178. Pinion 178 generally rotates when a driver provides a steering input, such as by turning a steering wheel. Typically, steering rack assembly 160 can be configured to be operated by power steering. For example pinion 178 can be rotated using a motor and/or another device that augments drive inputs. When pinion 178 rotates, pinion 178 engages teeth 176 on steering rack 172 and causes steering rack 172 to move linearly in longitudinal direction 164 (either to the left or right). When twisting forces applied through steering arm 190 impart rotations force to steering rack 172 about longitudinal centerline 166, pinion 178 can bind with teeth 176. This can cause excessive wear on steering rack 172 and/or pinon 178, interrupt steering feedback and control, overload the steering motor, and/or cause steering kickback among other issues. To mitigate or fully prevent such issues, brace assembly 70 is configured to support steering rack 172 and resist rotation about longitudinal centerline 166.

Figure 6:
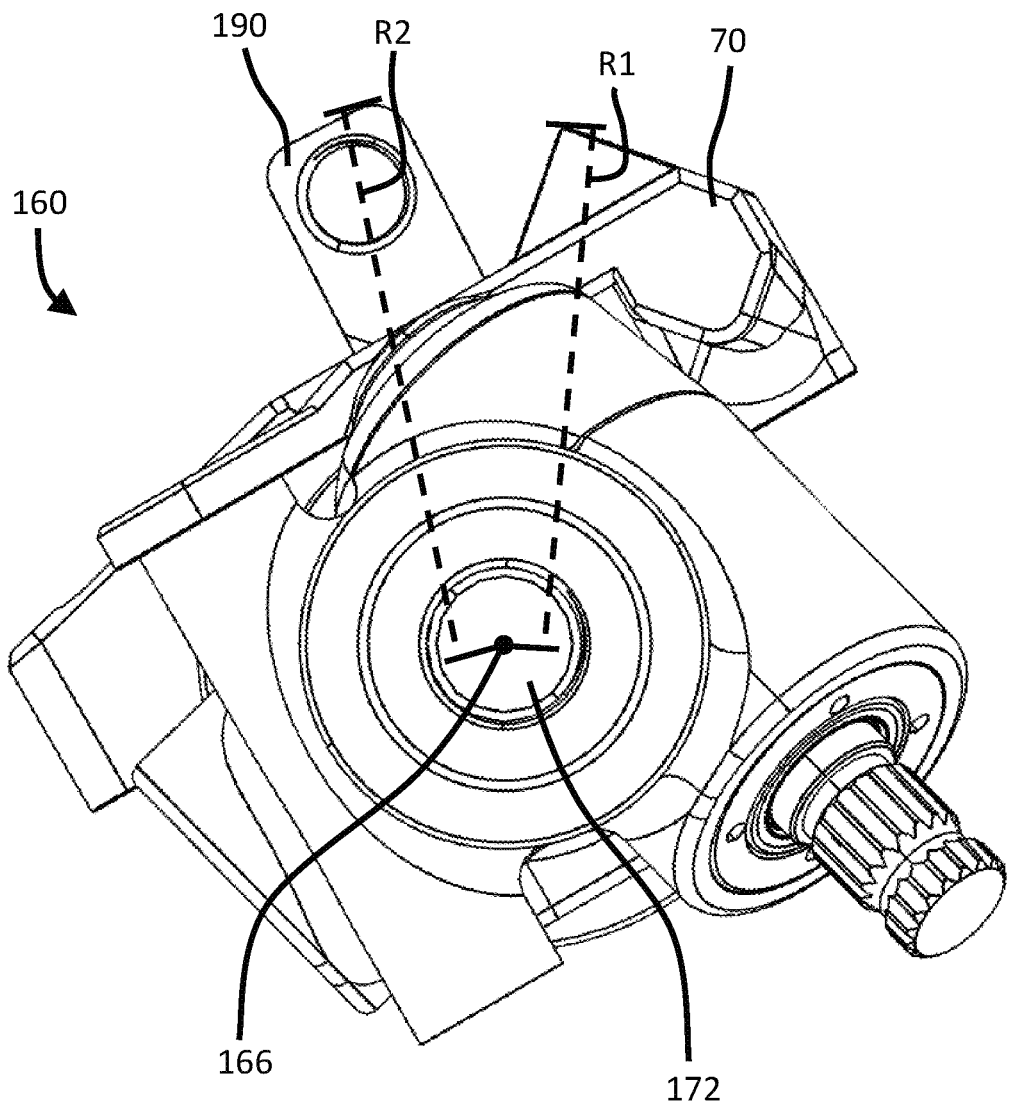
FIG. 6 is a side elevational view of the FIG. 3 steering rack assembly and brace assembly.

FIG. 6 shows a side elevational view of brace assembly 70 and steering rack assembly 160. Brace assembly 70 is generally compact. As shown, brace assembly 70 generally extends a smaller distance than steering arm 190 relative to steering rack 172. A maximum lateral displacement R1 of brace assembly 70 from longitudinal centerline 166 is less than a maximum lateral displacement R2 of steering arm 190 from longitudinal centerline 166. Because brace assembly 70 does not extend radially beyond steering arm 190, brace assembly 70 typically fits in the same spaces as steering rack assembly 160 normally fits. As shown in FIGS. 1 and 2, other components in vehicle 50 may limit the available space for installing brace assembly 70. The compact form of brace assembly 70 facilitates installation, especially in tight spaces within vehicle 50. For example, brace assembly 70 can be installed on steering rack assembly 160 without other modifications to vehicle 50, such as removing parts of vehicle 50 to provide additional space for brace assembly 70.

Figure 7:
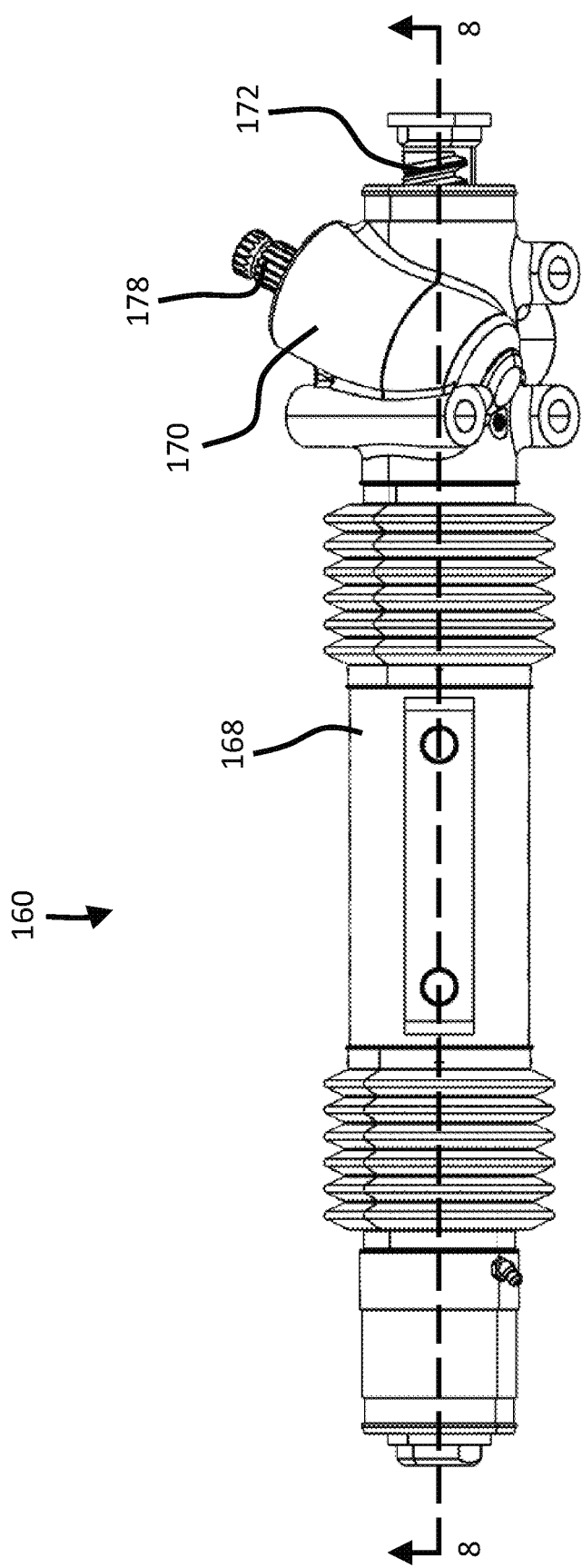
FIG. 7 is a top plan view of the FIG. 3 steering rack assembly.
Figure 8:
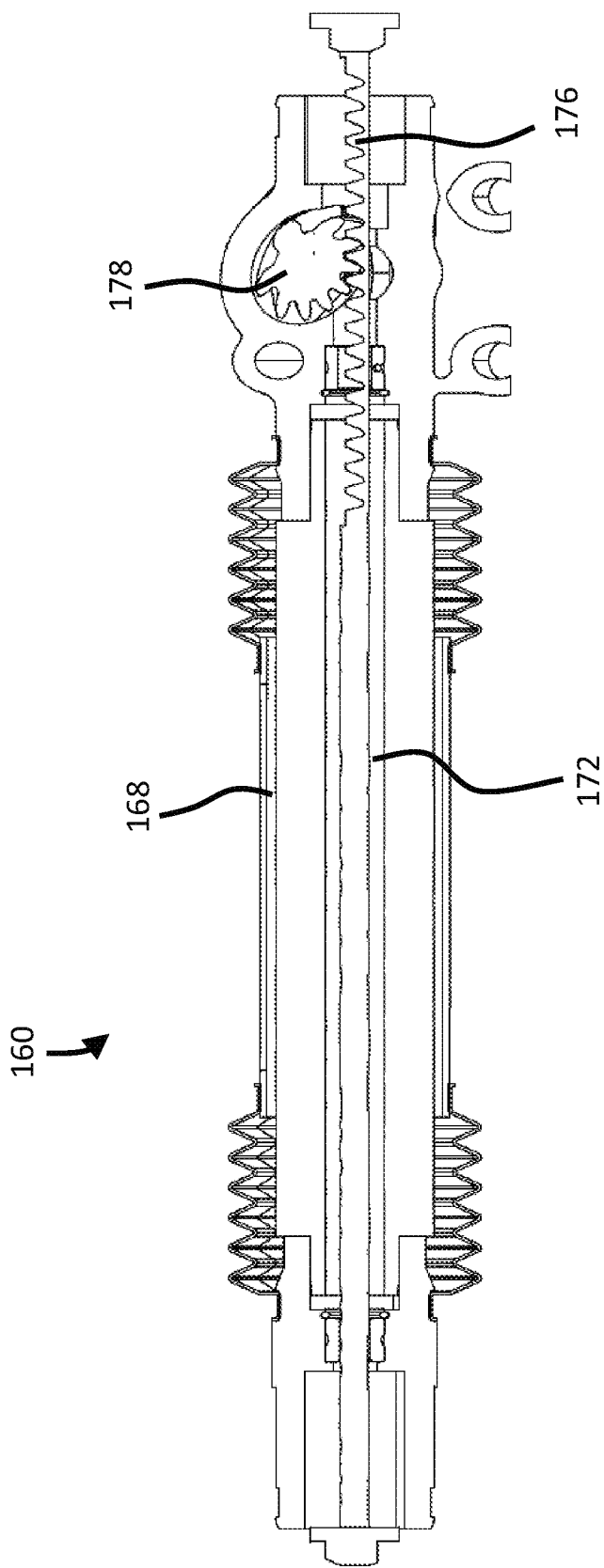
FIG. 8 is a cross-sectional view of the FIG. 3 steering rack assembly taken along line 8-8 in FIG. 7.
Figure 9:
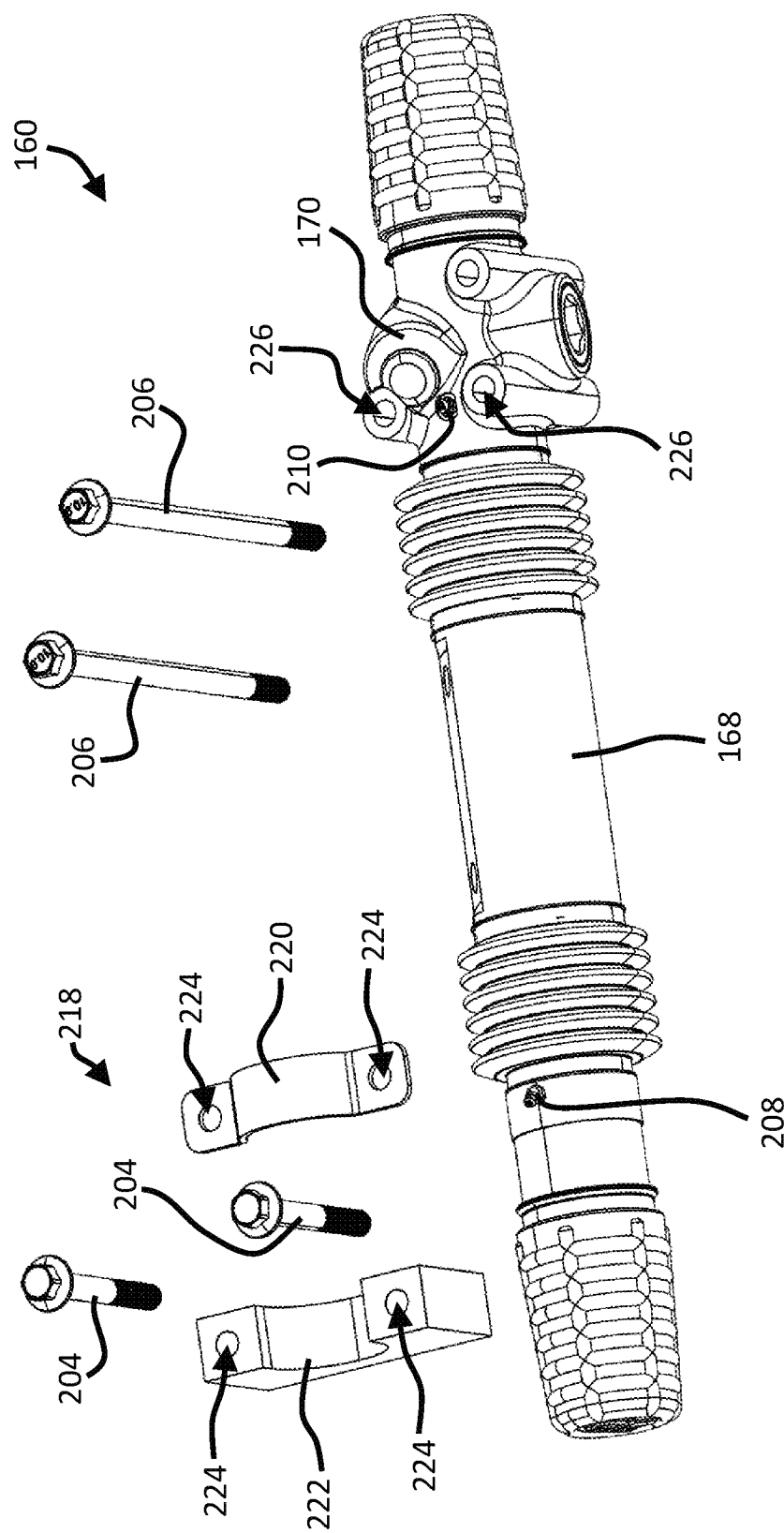
FIG. 9 is a partially exploded view of the FIG. 3 steering rack assembly.

Referring to FIGS. 7, 8, and 9, steering rack assembly 160 further includes a housing 168. Housing 168 generally encloses steering rack 172. Housing 168 can include multiple segments. Some segments are made of a rigid material, such as aluminum or steel. Some segments are made of a flexible material, such as rubber. Using flexible segments allows portions of housing 168 to move in longitudinal direction 164. For example, a portion of housing 168 can move with steering rack 172 in longitudinal direction 164 during steering. Housing 168 includes a protrusion 170. The interior of protrusion 170 provides space for pinion 178.

In the illustrated example, housing 168 is further configured to enclose a hydraulic fluid used for power steering. Housing 168 includes hydraulic inlets 208 and 210. Hydraulic inlets 208 and 210 allow hydraulic fluid to flow into and out of housing 168. Hydraulic inlets 208 and 210 are each configured to attach to a hydraulic line that carries hydraulic fluid.

To mount steering rack assembly 160 to vehicle 50, steering rack assembly 160 includes multiple fasteners 204 and 206, and a clamp 218. Fasteners 204 and 206 can be bolts, screws, and/or other types of fasteners. Clamp 218 attaches around a portion of housing 168 and secures housing 168 to the frame of vehicle 50. Clamp 218 includes a top portion 220 and a bottom portion 222. Clamp 218 defines fastener openings 224 that extend through both top portion 220 and bottom portion 222. Fastener openings 224 are configured to receive fasteners 204. Fasteners 204 secures top portion 220 and bottom portion 222 of clamp 218 together around housing 168. Fasteners 204 and clamp 218 are configured to secure one end of steering rack assembly 160 to the frame of vehicle 50. Housing 168 defines fastener openings 226 that are configured to receive fasteners 206. Fasteners 206 are configured to secure another end of steering rack assembly 160 to the frame of vehicle 50.

Figure 10:
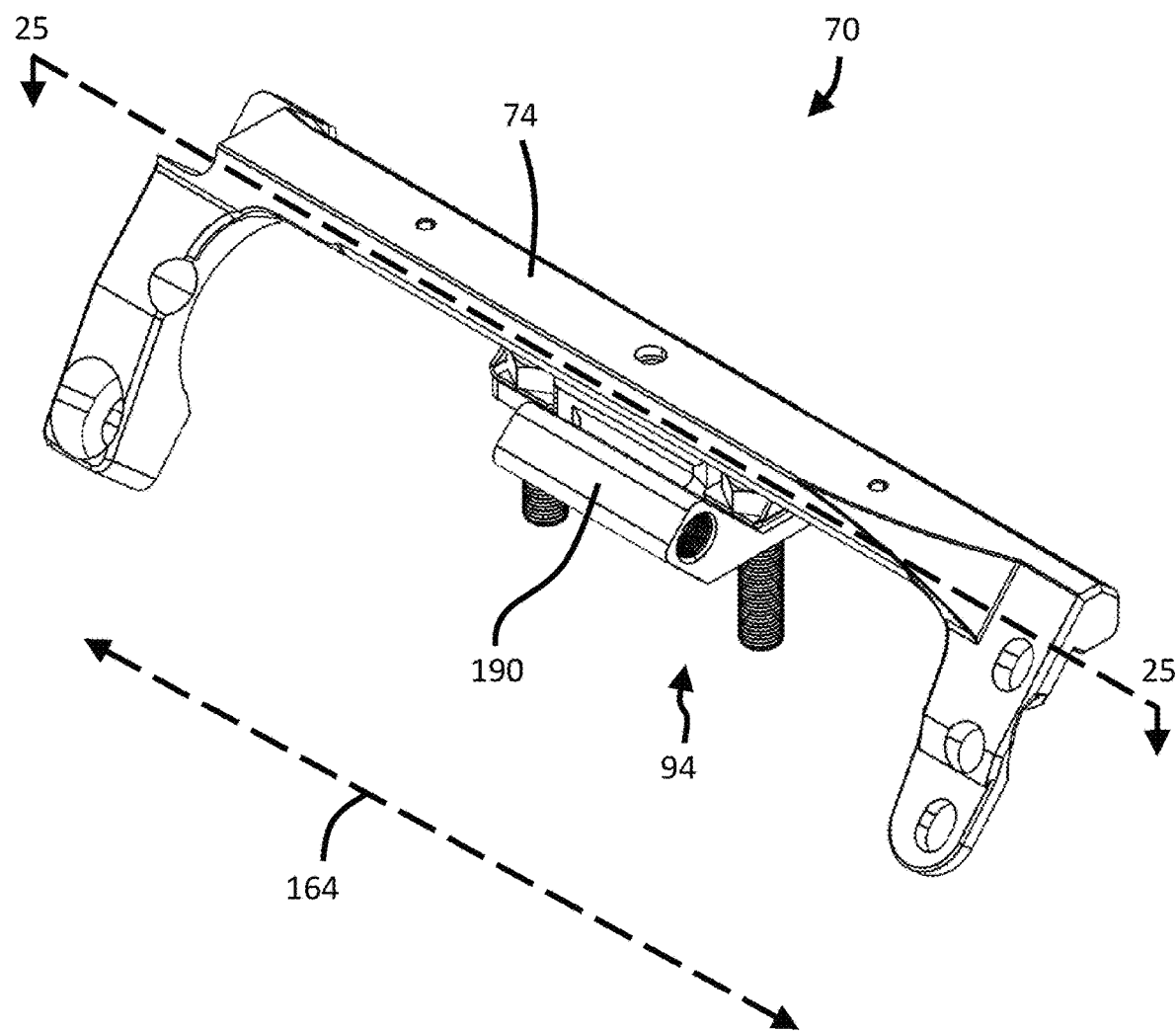
FIG. 10 is a perspective view of the FIG. 3 brace assembly.

Referring to FIG. 10, brace assembly 70 includes a brace 74 and a follower assembly 94. Brace 74 is configured to install onto steering rack assembly 160. Brace 74 is adapted to rigidly couple relative to the steering rack 172 such that brace 74 extends along longitudinal direction 164 proximate to housing 168. Follower assembly 94 is configured to attach to steering rack 172. Follower assembly 94 is configured to slide along longitudinal direction 164 relative to brace 74. Follower assembly 94 is adapted to rigidly couple to steering rack assembly 160 and traverse housing 168 in unison with steering arm 190. In one example, brace 74 and follower assembly 94 are movably coupled through bearings and a track. Further, in the illustrated example, steering arm 190 is integrated into brace assembly 70. Integrating steering arm 190 into brace assembly 70 can increase the strength of entire assembly and can reduce the size of the entire assembly.

Figure 11:
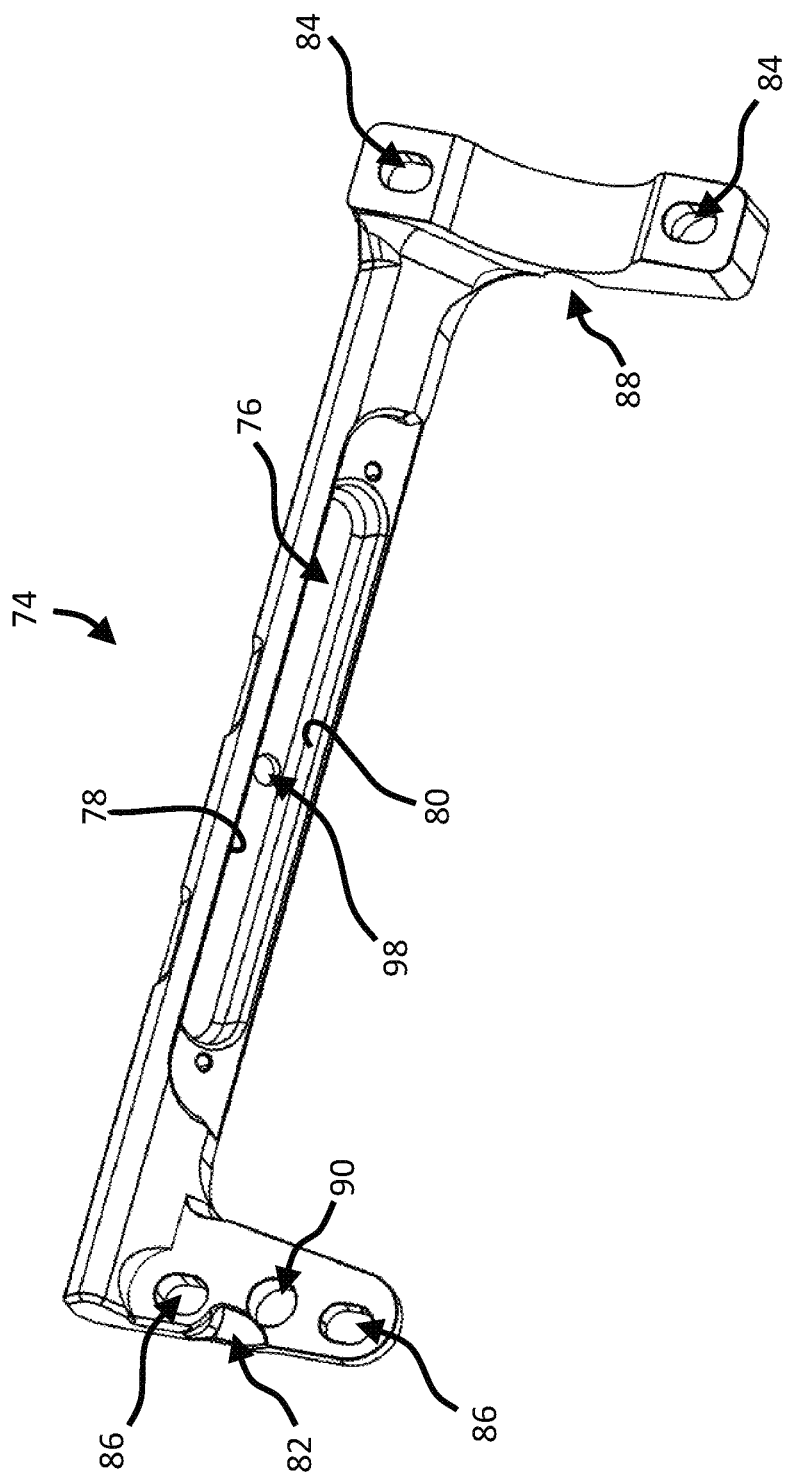
FIG. 11 is a rear perspective view of a brace, a component of the FIG. 3 brace assembly.
Figure 12:
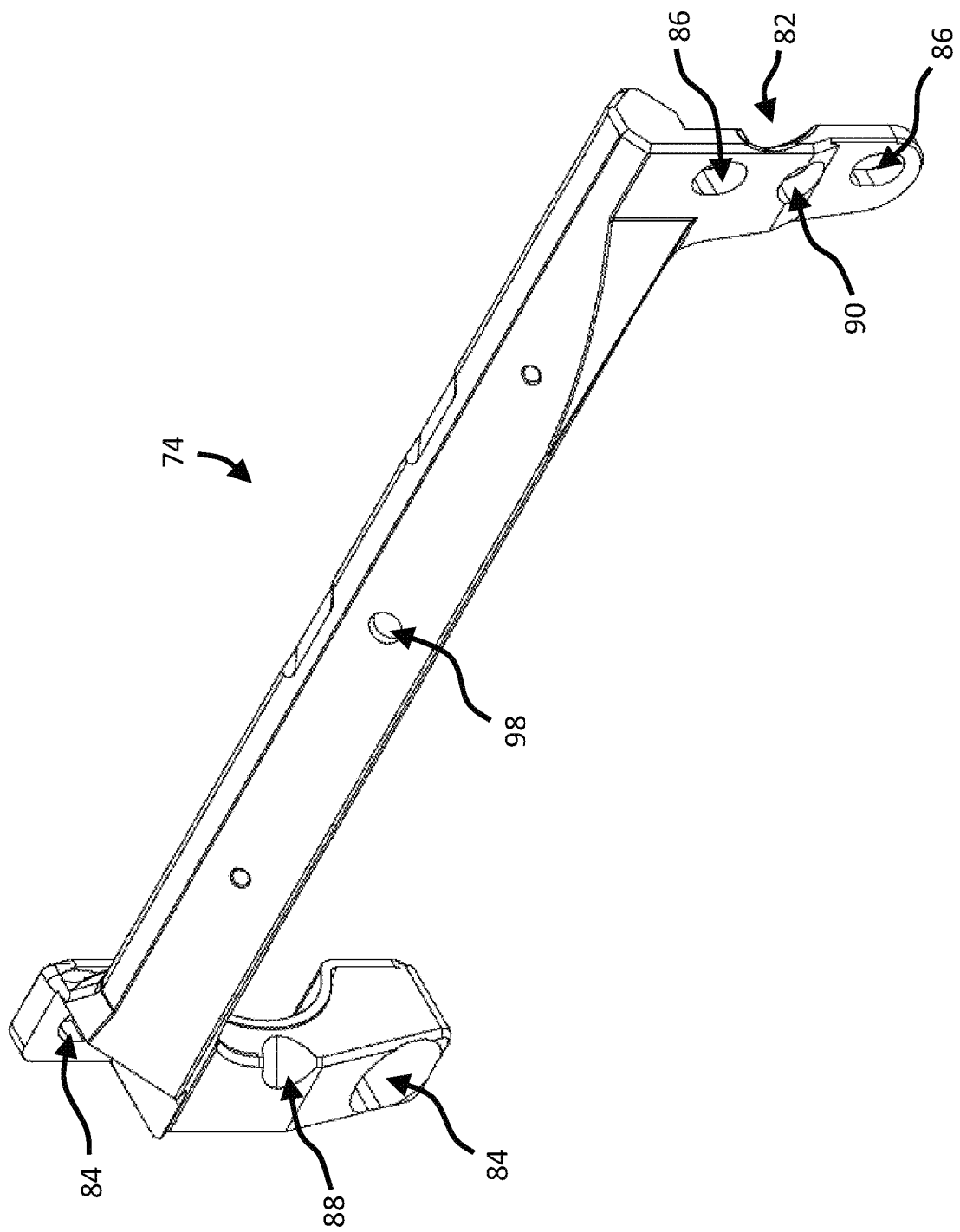
FIG. 12 is a front perspective view of the FIG. 11 brace.

FIGS. 11 and 12 illustrate brace 74. Brace 74 can be made of a rigid material, such as aluminum or steel. Brace 74 extends along longitudinal direction 164. When brace 74 is coupled to steering rack assembly 160, brace 74 generally extends outside and adjacent to housing 168. Brace 74 is generally spaced apart from housing 168 along the span that steering arm 190 can traverse. For example, at least the portion of brace 74 that defines linear track 76 can be spaced apart from housing 168.

Brace 74 defines a linear track 76. Linear track 76 extends along longitudinal direction 164. Brace 74 defines a first edge 78 and a second edge 80 that form part of the boundary of linear track 76. First edge 78 and second edge 80 are generally parallel such that most of linear track 76 has a consistent width. As noted, brace 74 provides a path that guides follower assembly 94. The consistent width and parallel edges 78 and 80 of linear track 76 guide follower assembly 94 to move smoothly in longitudinal direction 164. Further, linear track 76 can restrict follower assembly 94 to only moving in longitudinal direction 164 relative to brace 74.

Brace 74 is configured to attach to steering rack assembly 160 using fasteners 204 and 206 that attach steering rack assembly 160 to vehicle 50. Alternatively, fasteners 204 and 206 can be replaced with incrementally longer fasteners. By using the same or similar fasteners 204 and 206, brace 74 does not require modifications to vehicle 50 or steering rack assembly 160. As shown, brace 74 defines fastener openings 84 on one end. Fastener openings 84 on brace 74 generally mirror fastener openings 224 on clamp 218 of steering rack assembly 160, shown in FIG. 9. Fastener openings 84 are configured to receive fasteners 204 and allow fasteners 204 to extend through brace 74. When brace 74 is attached to steering rack assembly 160, fastener openings 84 on brace 74 align with fastener openings 224 on clamp 218. The mirrored openings 84 and 224 allow fasteners 204 to fix brace 74 relative to steering rack assembly 160 and to fix steering rack assembly 160 relative to vehicle 50.

On the other end, brace 74 defines fastener openings 86. Similarly, fastener openings 86 on brace 74 generally mirror fastener openings 226 on housing 168, shown in FIG. 9. Fastener openings 86 are configured to receive fasteners 206 and allow fasteners 206 to extend through brace 74. When brace 74 is attached to steering rack assembly 160, fastener openings 86 on brace 74 align with fastener openings 226 on housing 168. The mirrored openings 86 and 226 allow fasteners 206 to fix brace 74 relative to steering rack assembly 160 and to fix steering rack assembly 160 relative to vehicle 50.

Brace 74 is generally shaped to conform against one or more portions of housing 168. One end of brace 74 is shaped to fit against top portion 220 of clamp 218. Further, brace 74 defines a recess 82. Recess 82 is configured to receive protrusion 170 on housing 168. Recess 82 allows brace 74 to sit flush against housing 168. By conforming to various portions of housing 168, brace 74 helps the overall shape of brace assembly 70 and steering rack assembly 160 remain compact.

Brace 74 further defines a recess 88 and an inlet opening 90. Recess 88 provides space for a hydraulic line to connect to hydraulic inlet 208 on housing 168, shown in FIG. 9. When brace 74 is coupled to steering rack assembly 160, inlet opening 90 extends around hydraulic inlet 210 on housing 168. Inlet opening 90 provides space to access hydraulic inlet 210 and to connect a hydraulic line to hydraulic inlet 210.

Figure 13:
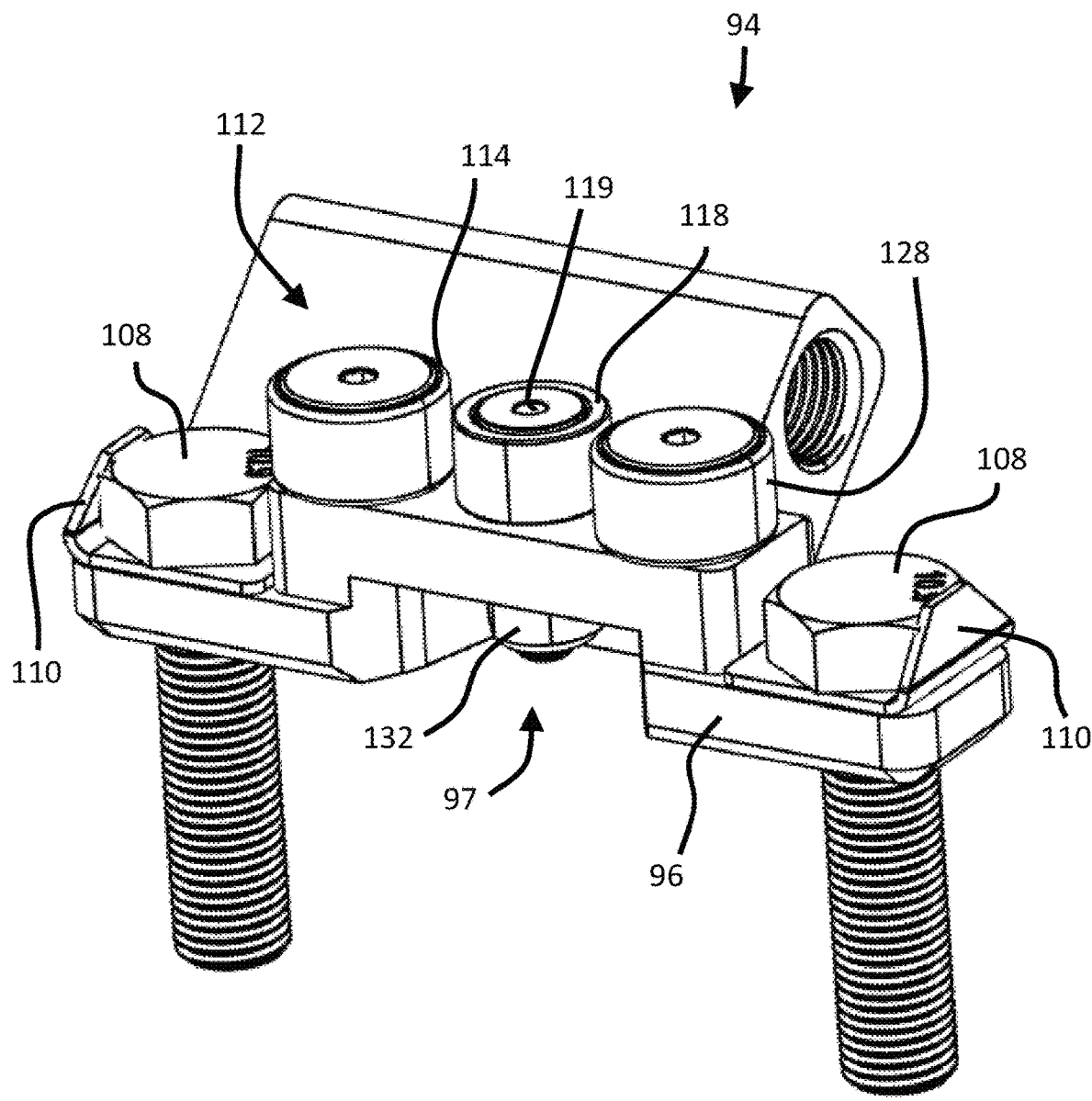
FIG. 13 is a perspective view of a follower assembly, a component of the FIG. 3 brace assembly.
Figure 14:
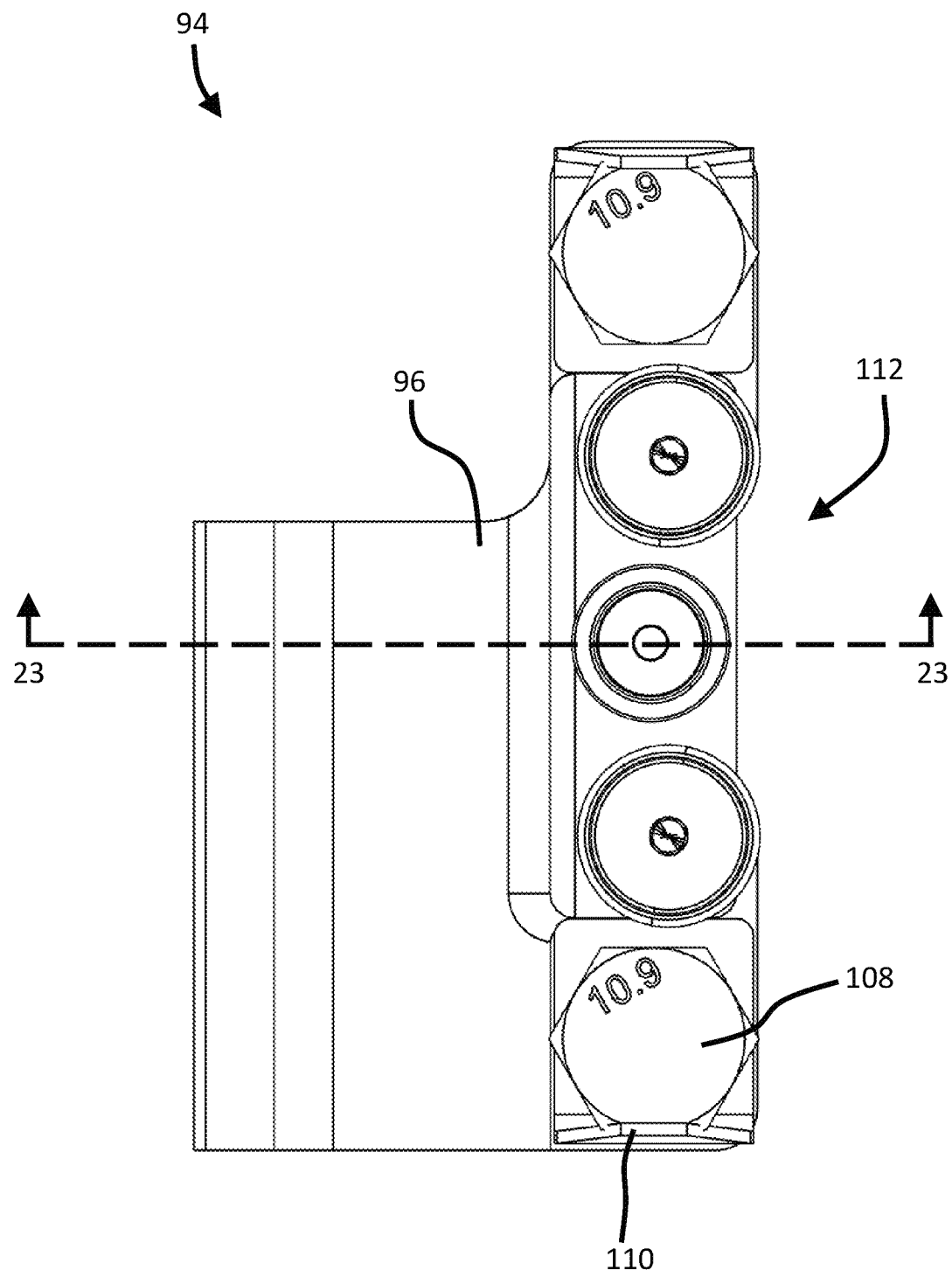
FIG. 14 is a top plan view of the FIG. 13 follower assembly.

Referring to FIGS. 13 and 14, follower assembly 94 generally includes a body 96 and a bearing group 112. Bearing group 112 includes a plurality of roller bearings. Body 96 can be made of a rigid material, such as aluminum or steel. Body 96 is configured to rigidly couple to steering rack 172. Bearing group 112 is attached to body 96. Bearing group 112 is configured to roll along brace 74 within linear track 76, shown in FIG. 11. Bearing group 112 supports body 96 and steering rack 172 to slide smoothly in longitudinal direction 164 while allowing brace 74 to resist rotation of steering rack 172 about longitudinal axis 166. In an alternate embodiment (not illustrated), follower assembly 94 could optionally define linear track 76 and bearing group 112 could optionally be attached to brace 74.

Follower assembly 94 further includes fasteners 108 and retainer tabs 110. Fasteners 108 include bolts, screws, and/or other types of fasteners. Fasteners 108 are configured to fix body 96 to steering rack 172. Fasteners 108 extend through retainer tabs 110. Retainer tabs 110 are configured to be bendable. After fasteners 108 are tightened, retainer tabs 110 can be bent to the illustrated configuration to resist rotation of fasteners 108. Each retainer tab 110 is configured to limit rotation and/or other movement of one fastener 108 to prevent that fastener 108 from detaching from steering rack 172. For example, retainer tabs 110 prevent fasteners 108 from unscrewing from steering rack 172 and body 96.

Figure 15:
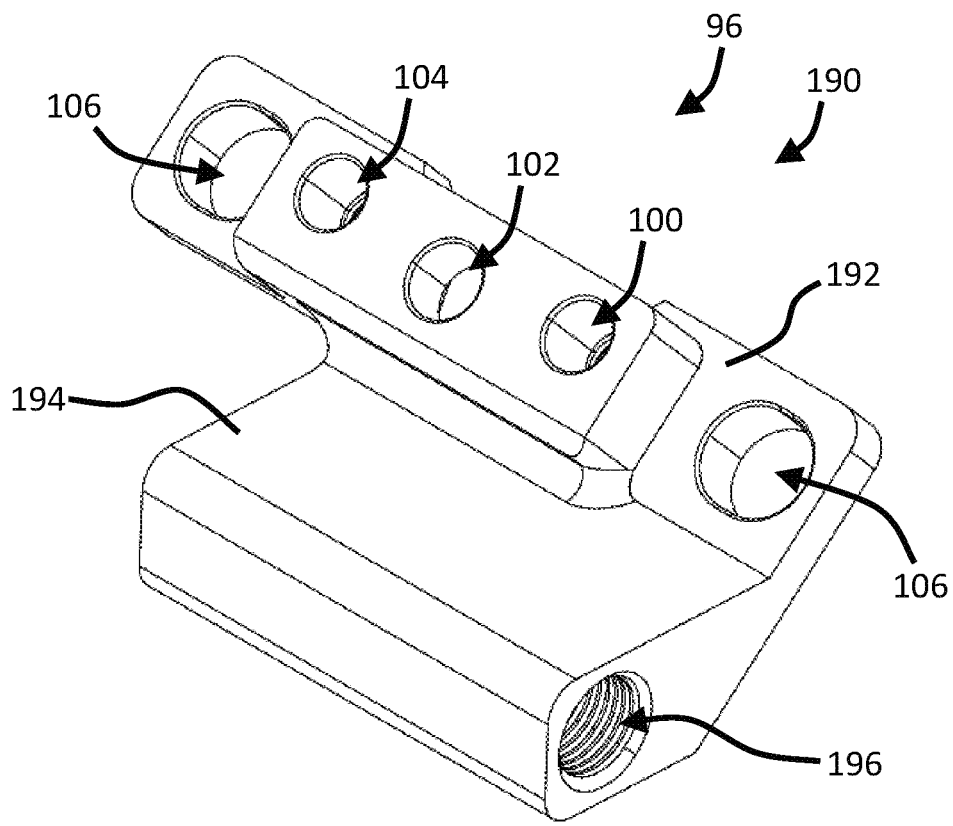
FIG. 15 is a top perspective view of a body, a component of the FIG. 13 follower assembly.
Figure 16:
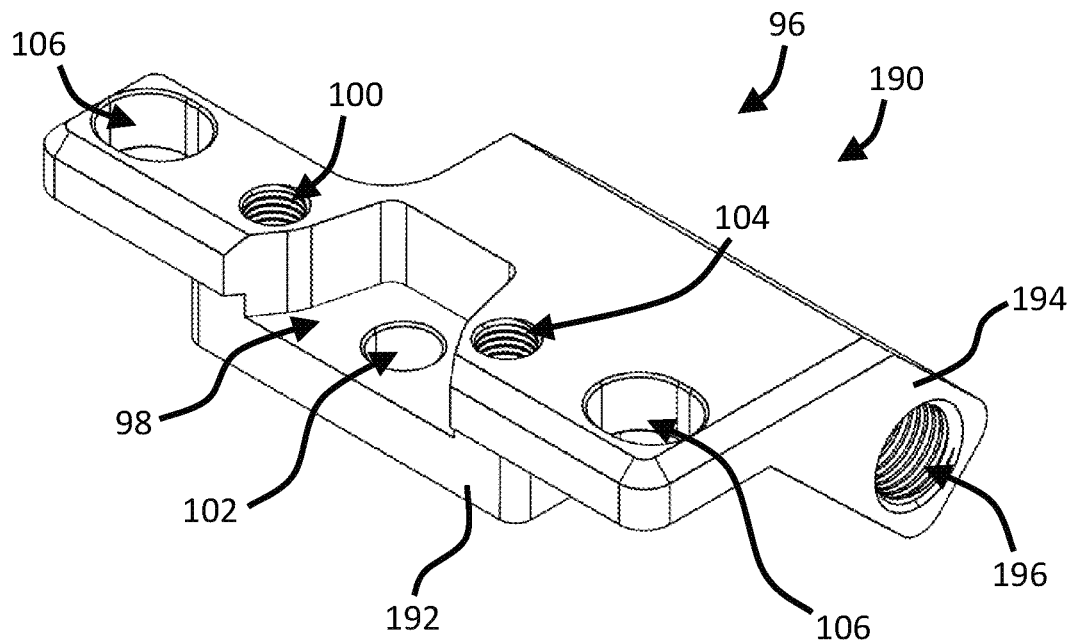
FIG. 16 is a bottom perspective view of the FIG. 15 body.

FIGS. 15 and 16 illustrate body 96 from follower assembly 94. Body 96 defines an access recess 97 and holes 100, 102, and 104. Holes 100, 102, and 104 are configured to receive bearing group 112. In the illustrated example, holes 100 and 104 have a threaded portion and hole 102 extends into access recess 97. Further, body 96 defines fastener openings 106. Fastener openings 106 are configured to receive fasteners 108. Fastener openings 106 generally mirror openings on steering rack 172 that receive fasteners 108. Fastener openings 106 align with openings on steering rack 172 to allow fasteners 108 to fix body 96 to steering rack 172. In one example, fasteners 108 are configured to fix body 96 to part of housing 168 in addition to steering rack 172.

In the illustrated example, steering arm 190 is integrated into body 96. Steering arm 190 and body 96 can be formed as a single piece of material. When installing brace assembly 70, a user can remove the original steering arm 190', shown in FIG. 4, and replace the original steering arm 190' with body 96. Integrating steering arm 190 into body 96 can save space within vehicle 50 and maintain the compact shape of brace assembly 70. In an alternate version, body 96 can couple to steering rack 172 on top of original steering arm 190'. In the FIGS. 15 and 16 example, steering arm 190 still includes first portion 192 and second portion 194. First portion 192 is configured to couple to steering rack 172. Second portion 194 is configured to couple to tie rod 54. As shown, second portion 194 defines a channel 196 that is configured to receive tie rod 54. Channel 196 can be threaded so as to allow tie rod 54 to screw into steering arm 190. As noted, second portion 194 extends laterally at an obtuse angle relative to the orientation of first portion 192. By extending laterally away from first portion 192, tie rod 54 is laterally offset from steering rack 172 and can impart a rotational force through steering arm 190.

Figure 17:
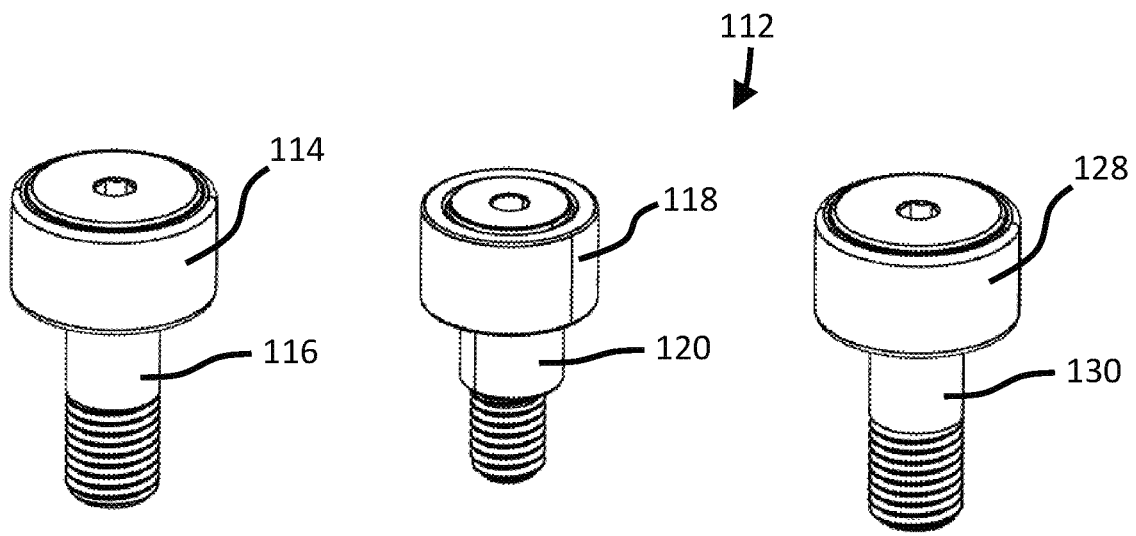
FIG. 17 is a perspective view of a roller bearing group, a component of the FIG. 13 follower assembly.
Figure 18:
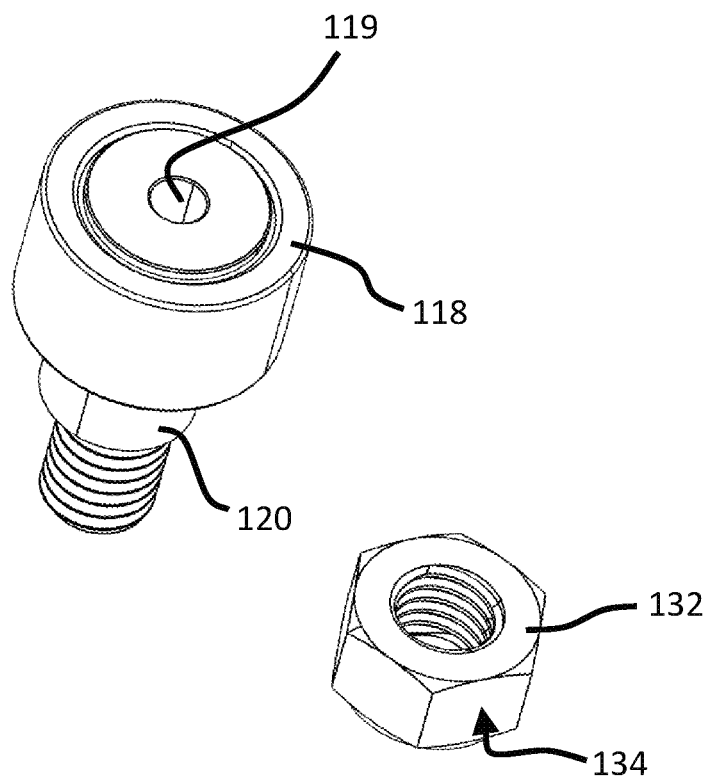
FIG. 18 is a perspective view of a second roller bearing from the FIG. 17 bearing group and a nut.
Figure 19:
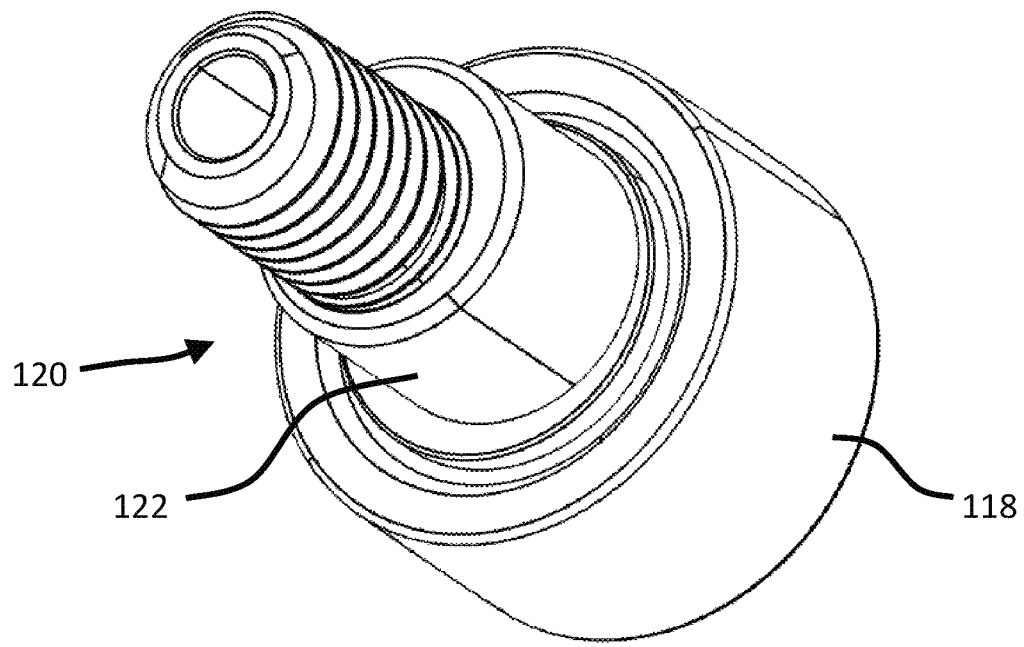
FIG. 19 is a first side perspective view of the FIG. 18 second roller bearing.
Figure 20:
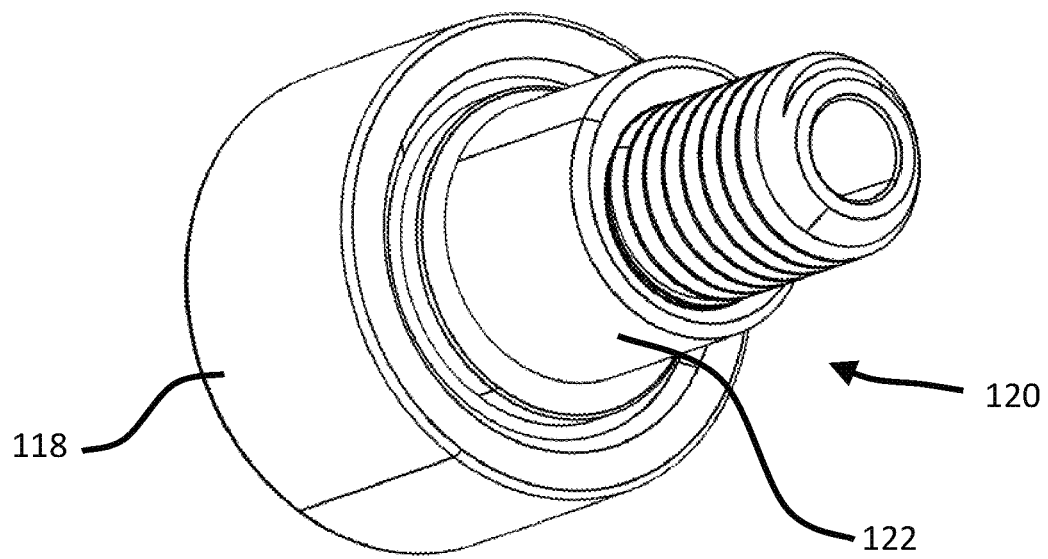
FIG. 20 is a second side perspective view of the FIG. 18 second roller bearing.
Figure 22:
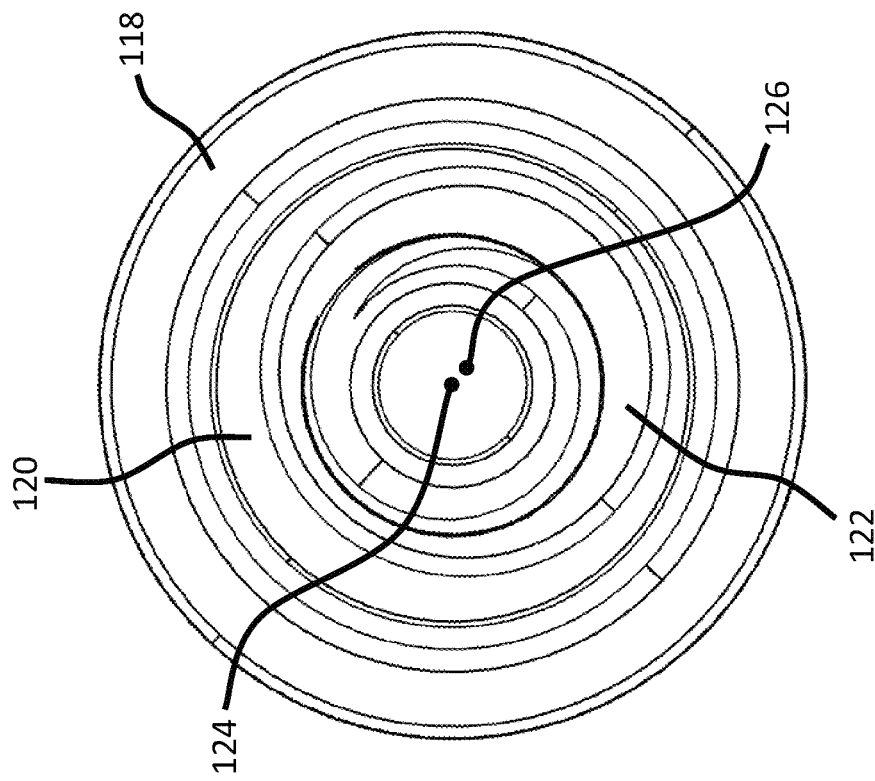
FIG. 22 is a bottom plan view of the FIG. 18 second roller bearing.
Figure 21:
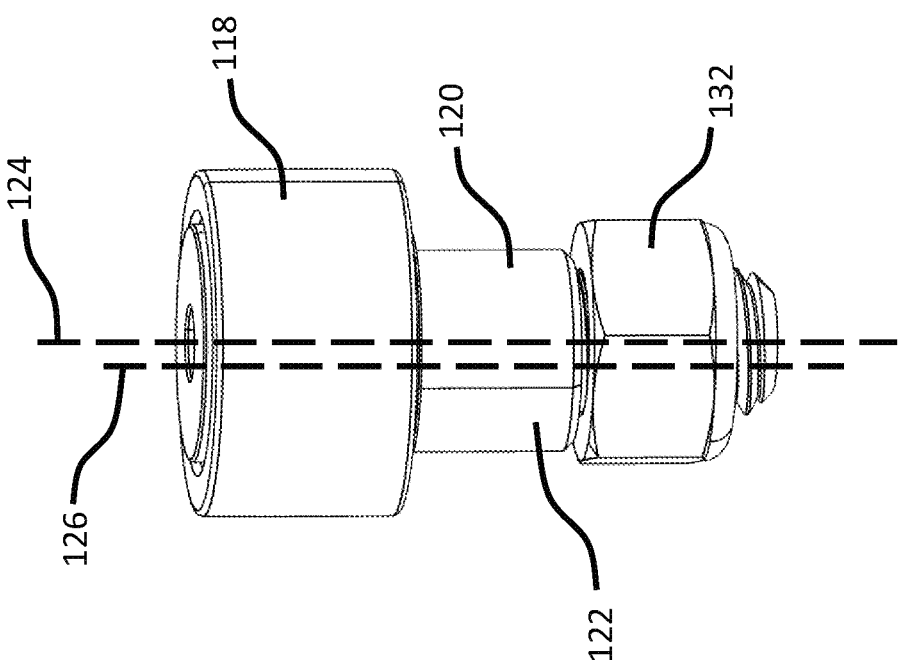
FIG. 21 is a front perspective view of the FIG. 18 second roller bearing and nut.

Referring to FIG. 17, bearing group 112 includes a roller bearing 114, a roller bearing 118, and a roller bearing 128. Bearings 114, 118, and 128 are generally configured to slide along linear track 76. Bearings 114, 118, and 128 generally resist rotation about longitudinal axis 166 within linear track 76. Using bearings 114, 118, and 128, follower assembly 94 resists rotation of steering rack 172 about longitudinal axis 166 while allowing steering rack 172 to slide along longitudinal axis 166. Again, rotating steering rack 172 about longitudinal axis 166 can cause excessive wear on steering rack 172, causing steering kickback or a lack of feedback, causing gear binding, and/or causing other issues. Roller bearings 114, 118, and 128 can help prevent such issues and ensure that steering rack assembly 160 operates consistently and safely.

Compared to other types of bearings, such as plain bearings, roller bearings experience less wear and slide with less friction. Using roller bearings ensures that follower assembly 94 can slide smoothly along brace 74 and can last a long time without needing replacement parts. In the illustrated example, bearing group 112 includes three bearings. In alternate examples, bearing group 112 can include one, two, or another number of bearings. Further, in the illustrated example, roller bearing 114 and roller bearing 128 can be the same size while roller bearing 118 can be a different size. In alternate examples, bearings 114, 118, and 128 can all be the same size or can be any combination of sizes.

Roller bearing 114 includes a shaft 116 and is configured to rotate about shaft 116. Similarly, roller bearing 128 includes a shaft 130 and is configured to rotate about shaft 130. Holes 100 and 104 are configured to receive shafts 116 and 130 respectively. Threading in hole 100 is configured to interact with threading on shaft 116 to fix shaft 116 to body 96 in hole 100. Similarly, threading in hole 104 is configured to interact with threading on shaft 128 to fix shaft 128 to body 96 in hole 104. As shown in FIG. 15, holes 100 and 104 are generally aligned along longitudinal direction 164. Holes 100 and 104 are positioned at the same point laterally from longitudinal axis 166 when installed on steering rack 172. Aligning holes 100 and 104 in this way ensures that bearings 114 and 128 are aligned in the same way.

In the illustrated example, roller bearing 118 includes an eccentric shaft 120. Roller bearing 118 rotates about eccentric shaft 120. Eccentric shaft 120 is configured to mount roller bearing 118 to body 96. Hole 102 on body 96 is configured to receive eccentric shaft 120. While shafts 116 and 130 generally maintain rotational symmetry along the length of shafts 116 and 130, one or more portions of eccentric shaft 120 are rotationally asymmetric. Because of the asymmetry of eccentric shaft 120, the position of roller bearing 118 is selectively adjustable by rotating eccentric shaft within hole 102. Conversely, roller bearing 114 and roller bearing 128 are configured to maintain the same position relative to body 96. In an alternate example, roller bearing 118 can include a regular shaft in the style of shaft 116 or shaft 130.

Referring to FIGS. 18 through 22, roller bearing 118 can be optionally coupled to eccentric shaft 120. Nut 132 is configured to engage eccentric shaft 120 through threads on nut 132 and on eccentric shaft 120. Nut 132 defines a wrenching surface 134. Wrenching surface 134 is generally accessible by a tool, such as a wrench. A user can engage nut 132 through wrenching surface 134. By engaging wrenching surface 134 of nut 132, a user can rotate eccentric shaft 120 and adjust the position of roller bearing 118 relative to body 96. Roller bearing 118 includes a wrenching surface 119 that is accessible from above roller bearing 118. Wrenching surface 119 can be an internal wrenching surface such as a hexagonal recess that can receive a hex wrench. Other types of internal wrenching surfaces include, but are not limited to, cruciform recesses, slotted recesses, square recesses, multiple-square recesses, pentalobular recesses, hexabobular recesses and various tamper-resistant recesses. Brace assembly 70 defines an access opening 98 that provides space for a user to insert a tool, such as a wrench, to access wrenching surface 119 when roller bearing 118 is positioned below access opening 98.

As illustrated, eccentric shaft 120 includes an eccentric outer surface 122. Eccentric outer surface 122 defines a circular surface that is offset from the center of rotation of shaft 120 and roller bearing 118. When roller bearing 118 is attached to body 96, eccentric outer surface 122 is positioned within hole 102 on body 96. Eccentric outer surface 122 contacts the inner surface of hole 102 when rotating within hole 102. When eccentric shaft 120 rotates relative to body 96, eccentric outer surface 122 laterally moves the relative position of eccentric shaft 120 within hole 102. Because eccentric outer surface 122 is offset from roller bearing 118, the position of roller bearing 118 relative to body 96 changes when eccentric outer surface 122 rotates in hole 102 of body 96.

Roller bearing 118 defines a bearing axis 124 that extends through the center of roller bearing 118. Eccentric outer surface 122 defines a cam axis 126 that extends through the center of eccentric outer surface 122. As shown, cam axis 126 is laterally offset from bearing axis 124. When eccentric shaft 120 rotates about cam axis 126, Bearing axis 124 revolves about cam axis 126. As a result, roller bearing 118 changes position. Adjusting the relative position of roller bearing 118 in this way allows adjustment of the fit of follower assembly 94 relative to brace 74. In other words, roller bearing 118 can be selectively adjusted to adjust the lateral play between brace 74 and bearing group 112 in linear track 76. Reducing lateral play reduces movement of follower assembly 94 relative to brace 74 to reduce rotation of follower assembly 94 and steering rack 172 about longitudinal axis 166.

Figure 23:
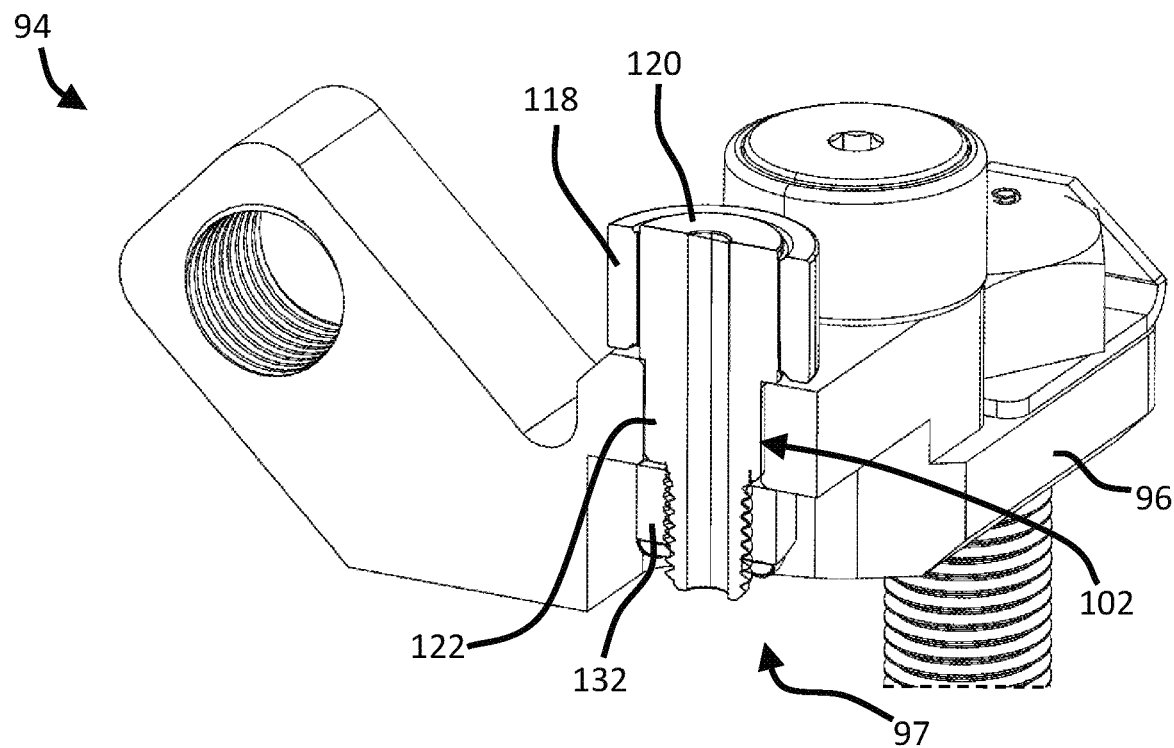
FIG. 23 is a cross-sectional view of the FIG. 13 follower assembly, taken along line 23-23 in FIG. 14, showing the FIG. 18 second roller bearing in a first orientation.
Figure 24:
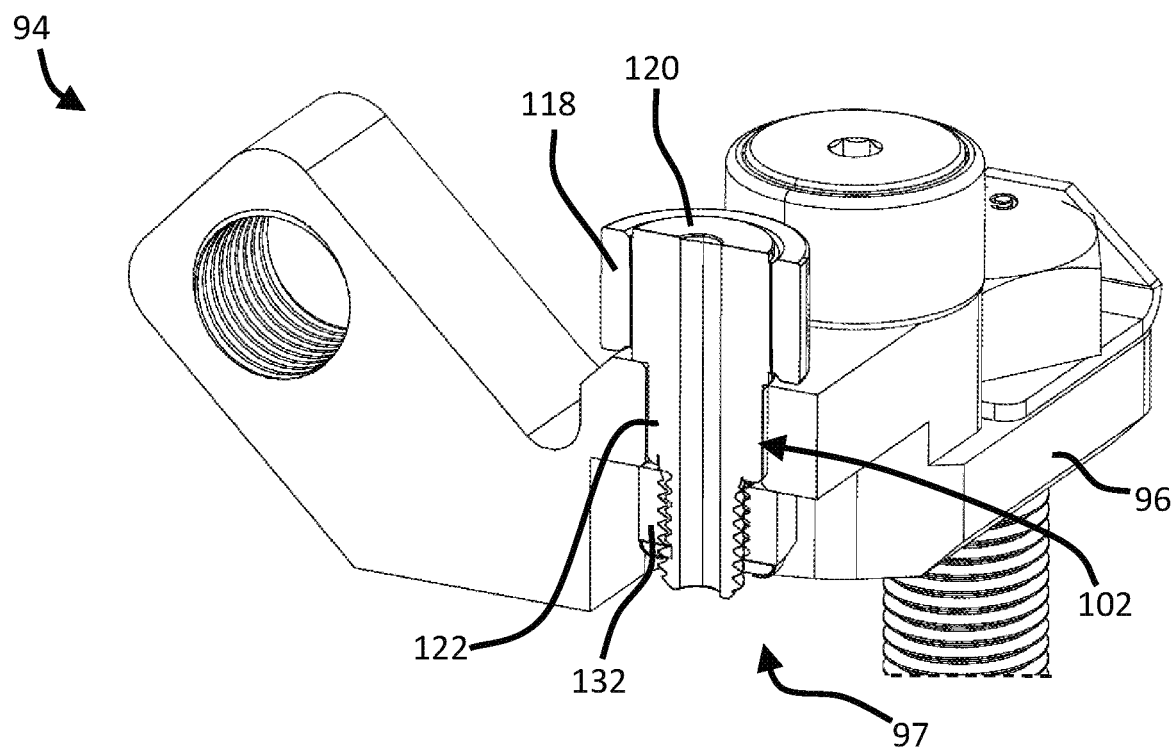
FIG. 24 is the cross-sectional view of the FIG. 13 follower assembly from FIG. 23 showing the FIG. 18 second roller bearing in a second orientation.

FIGS. 23 through 26 show roller bearing 118 in different positions in brace assembly 70. As shown in FIGS. 23 and 24, nut 132 is positioned in access recess 97. Access recess 97 provides a space for a user to insert a tool to engage nut 132. Roller bearing 118 is selectively alignable with access recess 97. In one example, a user can rotate nut 132 with a tool so as to position roller bearing 118 directly above access recess 97. When rotating nut 132 the other way, roller bearing 118 can be partially laterally offset from access recess 97. Further, roller bearing 118 is selectively alignable with access opening 98, shown in FIGS. 11 and 12. For instance, a user can rotate nut 132 with a tool so as to position roller bearing 118 directly beneath access opening 98. Access opening 98 provides a space for a user to insert a tool to adjust roller bearing 118. Both access recess 97 and access opening 98 allow a user to insert tools to adjust roller bearing 118. Access recess 97 allows a user to engage wrenching surface 134 of nut 132. Access opening 98 allows a user to engage wrenching surface 119 on bearing 118.

Figure 25:
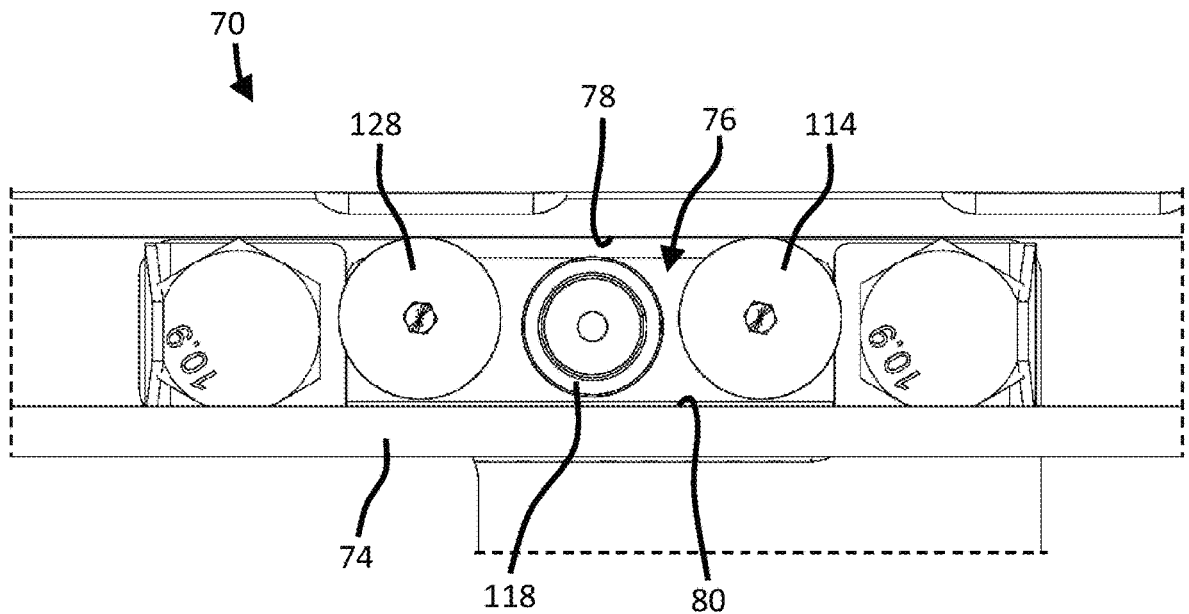
FIG. 25 is a cross-sectional view of the FIG. 3 brace assembly taken along line 25-25 in FIG. 10, showing the FIG. 18 second roller bearing in the first orientation.

As illustrated, eccentric outer surface 122 is positioned within hole 102 of body 96. Because eccentric outer surface 122 is laterally offset from the center of roller bearing 118, the position of roller bearing 118 changes as eccentric shaft 120 rotates. In FIGS. 23 and 25, eccentric shaft 120 is rotated such that roller bearing 118 is positioned towards the center of body 96. Conversely, in FIGS. 24 and 26, eccentric shaft 120 is rotated such that roller bearing 118 is positioned toward a lateral edge of body 96.

Figure 26:
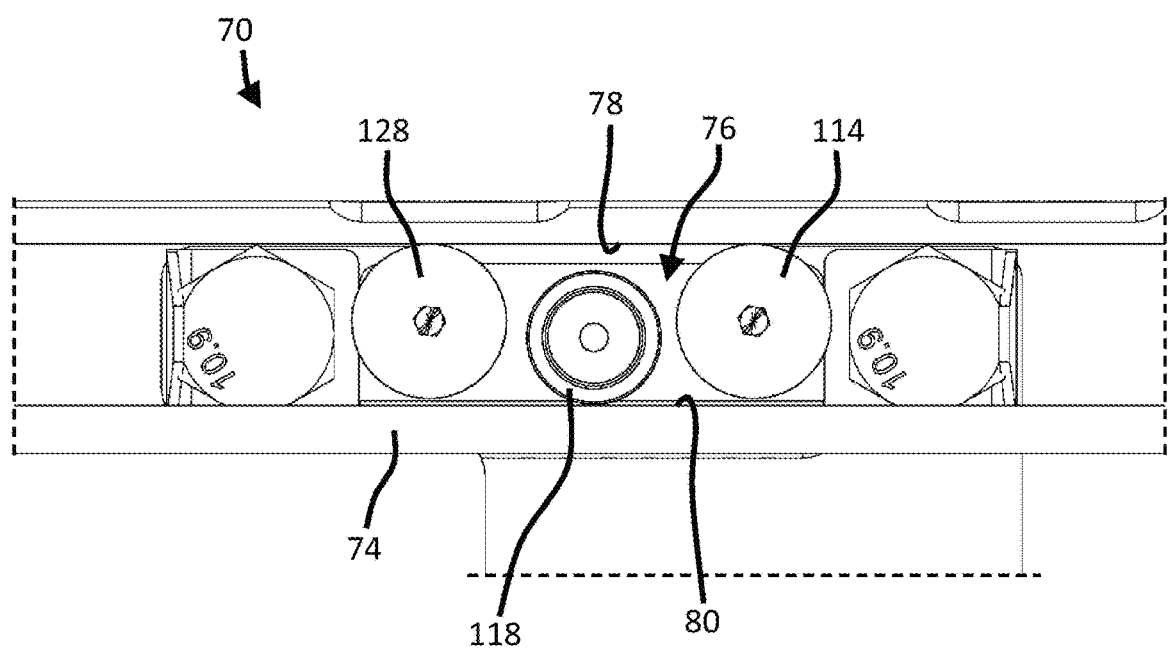
FIG. 26 is the cross-sectional view of the FIG. 3 brace assembly from FIG. 25 showing the FIG. 18 second roller bearing in the second orientation.

As shown in FIGS. 25 and 26, roller bearing 114 and roller bearing 128 are positioned against first edge 78 of linear track 76. In the illustrated example, roller bearing 114 and roller bearing 128 do not span the full width of linear track 76 and are spaced apart from second edge 80. In an alternative example, roller bearing 114 and/or roller bearing 128 can span the full width of linear track 76. In the FIG. 25 arrangement, roller bearing 118 is spaced apart from second edge 80. Because none of bearings 114, 118, and 128 contact second edge 80 in this arrangement, there is lateral play between bearing group 112 and brace 74. Such lateral play can allow steering rack 172 to rotate about longitudinal axis 166 to some degree. However, in the FIG. 26 arrangement, roller bearing 118 is adjusted to contact second edge 80 of linear track 76. In this arrangement, bearing group 112 contacts both first edge 78 and second edge 80 of linear track 76. Compared to the FIG. 25 arrangement, the lateral play between bearing group 112 and brace 74 at linear track 76 is reduced or completely eliminated. Therefore, steering rack 172 is greatly restricted or completely prevented from rotating about longitudinal axis 166.

In the illustrated example, roller bearing 118 is positioned intermediately between roller bearing 114 and roller bearing 128 along longitudinal direction 164. Positioning bearings 114, 118, and 128 in this way creates three points of support for bearing group 112 against brace 74. Using three points of support fixes the orientation of follower assembly 94 and steering rack 172 relative to brace 74. Bearings 114, 118, and 128 are configured to traverse linear track 76 while maintaining a consistent orientation. In this way, follower assembly 94 and brace 74 maintain the orientation of steering rack 172 relative to housing 168 while allowing steering rack 172 to traverse housing 168. As should be appreciated, brace assembly 70 can utilize any number and/or arrangement of bearings in bearing group 112. Further, in the illustrated example, bearing group 112 is a part of follower assembly 94 and brace 74 defines linear track 76. In an alternate version, bearing group 112 can be part of brace 74 and follower assembly 94 can define linear track 76.

While the present disclosure has been illustrated and described in detail in the drawings and foregoing description, the same is to be considered as illustrative and not restrictive in character, it being understood that a preferred embodiment has been shown and described and that all changes, equivalents, and modifications that come within the spirit of the claimed invention defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Merriam-Webster dictionary.

The invention claimed is:

1. A brace assembly adapted for use with a steering rack assembly that includes a housing, a steering rack movably disposed with respect to the housing and a steering arm that traverses the housing in a longitudinal direction when the steering rack moves, wherein the steering rack assembly defines a longitudinal centerline, wherein the steering arm is adapted to receive a tie rod, wherein the brace assembly comprises:

a brace adapted to be rigidly coupled relative to the steering rack such that the brace extends along the longitudinal direction proximate to the housing;

a follower assembly adapted to rigidly couple to the steering rack assembly and traverse the housing in unison with the steering arm;

wherein one of the brace assembly or the follower assembly defines a linear track that extends in the longitudinal direction;

wherein the other of the brace or the follower assembly comprises a first roller bearing adapted to traverse the linear track to resist rotational forces applied to the steering rack about the longitudinal centerline.

2. The brace assembly of claim 1, wherein the other of the brace or the follower assembly comprises a second roller bearing adapted to traverse the linear track, wherein a position of the second roller bearing is selectively movable relative to the first roller bearing to reduce lateral play of the first and second roller bearings relative to the linear track.

3. The brace assembly of claim 2, wherein the brace defines the linear track and the follower assembly comprises the first and second roller bearings.

4. The brace assembly of claim 3, wherein the second roller bearing further comprises an eccentric mounting shaft and wherein the position of the second roller bearing is selectively movable relative to the first roller bearing by rotating the eccentric mounting shaft.

5. The brace assembly of claim 4, wherein the brace assembly defines an access opening that is selectively alignable with the second roller bearing such that the position of the second roller bearing can be adjusted with a first tool passing through the access opening.

6. The brace assembly of claim 5, wherein the second roller bearing further comprises a nut threadingly engaged with the eccentric mounting shaft, wherein the nut comprises a wrenching surface that is accessible with a second tool.

7. The brace assembly of claim 6, wherein the follower assembly comprises a third roller bearing adapted to traverse the linear track, wherein the second roller bearing is positioned intermediate between the first and third roller bearings.

8. The brace assembly of claim 2, wherein the second roller bearing further comprises an eccentric mounting shaft and wherein the position of the second roller bearing is selectively adjustable relative to the first roller bearing by rotating the eccentric mounting shaft.

9. The brace assembly of claim 8, wherein the other of the brace or the follower assembly comprises a third roller bearing adapted to traverse the linear track, wherein the second roller bearing is positioned intermediate between the first and third roller bearings.

10. The brace assembly of claim 1, wherein a maximum lateral displacement of the steering arm from the longitudinal centerline is greater than a maximum lateral displacement of the brace from the longitudinal centerline.

11. The brace assembly of claim 1, wherein the housing defines a plurality of fastener openings that are adapted to secure the housing relative to a vehicle and wherein the brace defines a plurality of mirrored openings that are adapted to align with the plurality of fastener openings such that a single fastener can extend through both the brace and the housing to secure the brace relative to the housing and the housing relative to the vehicle.

12. The brace assembly of claim 1, wherein the brace is spaced apart from the housing everywhere the steering arm can traverse.

13. The brace assembly of claim 1, wherein the follower assembly is coupled to the steering arm.

14. The brace assembly of claim 1, wherein the steering rack includes a cylindrical rack.

15. The brace assembly of claim 14, wherein the steering arm includes a first portion that extends radially away from the cylindrical rack and a second portion that extends laterally from the first portion at an obtuse angle from the first portion, wherein the brace is aligned with the first portion of the steering arm and the second portion of the steering arm is laterally offset from the brace.

16. A steering rack assembly comprising:
a housing;
a steering rack movably disposed with respect to the housing;
a steering arm that traverses the housing in a longitudinal direction when the steering rack moves, wherein the steering rack assembly defines a longitudinal centerline, and wherein the steering arm is adapted to receive a tie rod; and
the brace assembly of claim 1.

17. The steering rack assembly of claim 16, wherein the other of the brace or the follower assembly comprises a second roller bearing adapted to traverse the linear track, wherein a position of the second roller bearing is selectively adjustable relative to the first roller bearing to reduce lateral play of the first and second roller bearings relative to the linear track.

18. The steering rack assembly of claim 17, wherein the brace defines the linear track and the follower assembly comprises the first and second roller bearings.

19. The steering rack assembly of claim 18, wherein the second roller bearing further comprises an eccentric mounting shaft and wherein the position of the second roller bearing is selectively adjustable relative to the first roller bearing by rotating the eccentric mounting shaft.

20. The steering rack assembly of claim 19, wherein the follower assembly comprises a third roller bearing adapted to traverse the linear track, wherein the second roller bearing is positioned intermediate between the first and third roller bearings.

* * * * *